United States Patent
Tripp

(10) Patent No.: US 12,475,347 B2
(45) Date of Patent: Nov. 18, 2025

(54) SELECTIVELY OPERABLE RADIOFREQUENCY DEVICE WITH PARTIAL SLOT ANTENNA

(71) Applicant: ZEBRA TECHNOLOGIES CORPORATION, Lincolnshire, IL (US)

(72) Inventor: Chad E. Tripp, Jacksonville, FL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 389 days.

(21) Appl. No.: 18/140,731

(22) Filed: Apr. 28, 2023

(65) Prior Publication Data

US 2024/0322441 A1    Sep. 26, 2024

Related U.S. Application Data

(60) Provisional application No. 63/454,201, filed on Mar. 23, 2023.

(51) Int. Cl.
| | |
|---|---|
| G06K 19/07 | (2006.01) |
| G06K 19/00 | (2006.01) |
| H01Q 13/10 | (2006.01) |
| G06K 7/10 | (2006.01) |
| H01Q 1/22 | (2006.01) |
| H01Q 1/42 | (2006.01) |

(52) U.S. Cl.
CPC ......... *G06K 19/0724* (2013.01); *G06K 19/00* (2013.01); *G06K 19/07* (2013.01); *H01Q 13/10* (2013.01); *G06K 7/10* (2013.01); *H01Q 1/2208* (2013.01); *H01Q 1/422* (2013.01)

(58) Field of Classification Search
CPC . G08B 13/14; H04B 7/00; H04B 5/00; G06K 7/10; G06K 7/10178; G06K 7/1036; G06K 7/10346; G06K 19/00; G06K 19/045; G06K 19/07; G06K 19/0724; G06K 19/077; G06K 19/07749; H01F 38/00; H01Q 1/24; H01Q 1/28
See application file for complete search history.

(56) References Cited

U.S. PATENT DOCUMENTS

| | | | |
|---|---|---|---|
| 7,920,096 B2 | 4/2011 | Fogg et al. | |
| 8,717,238 B2 | 5/2014 | Fogg et al. | |
| 2005/0186902 A1* | 8/2005 | Lieffort | G06K 7/10346 455/41.1 |
| 2011/0278947 A1* | 11/2011 | Hennig | H01Q 1/2216 307/104 |
| 2019/0337006 A1* | 11/2019 | Fritz | B05B 1/14 |
| 2023/0177287 A1 | 6/2023 | Austin | |

\* cited by examiner

*Primary Examiner* — Van T Trieu

(57) ABSTRACT

A selectively readable RFID tag includes a partial slot antenna; an inductive loop disposed proximate to the partial slot antenna; and an electronic circuit. The electronic circuit is operatively coupled to the inductive loop to selectively respond to far-field radiofrequency communication based on a distance between the partial slot antenna and a separate conductive element.

23 Claims, 13 Drawing Sheets

SELECTIVELY OPERABLE RADIOFREQUENCY DEVICE WITH PARTIAL SLOT ANTENNA

RELATED APPLICATIONS

The present application claims priority to and the benefit of U.S. Provisional Application No. 63/454,201, filed on Mar. 23, 2023, which is incorporated by reference herein in its entirety.

BACKGROUND

Devices configured to communicate using wireless communication often utilize radiofrequency (RF) communication. These RF devices include RF transmitters and/or receivers configured to transmit and/or receive the RF communication at one or more specified frequencies and also include antennas designed for the one or more specified frequencies to convert the radiofrequency waves propagating through space to electric currents for the receivers or to convert electrical current from the transmitters to radiofrequency waves propagating in space.

One type of RF technology is Radio Frequency Identification (RFID) technology, such as RFID tags or transponders, that may be deployed in a variety of environments and typically are used to provide information about objects to which they are affixed. As an example, RFID tags are typically affixed to and associated with objects to be tracked and an RFID reader or interrogator is configured to communicate with the RFID tags to track a location of the RFID tags and/or to obtain data stored by the RFID tags, such as for example, a stock keeping unit (SKU) code or other data identifying the object to which the tag is attached.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
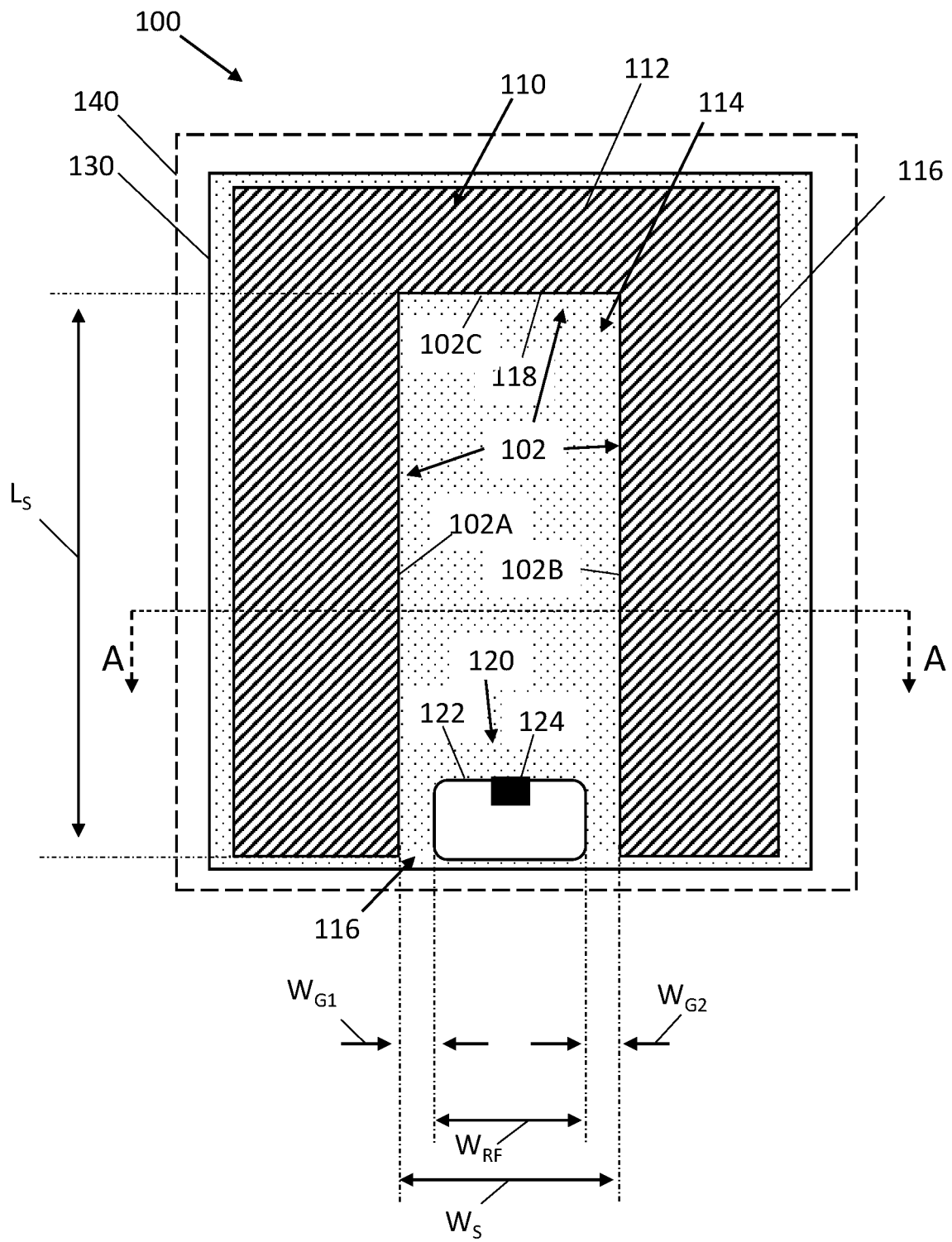
FIG. 1A is schematic view of an example RFID tag with a partial slot antenna in accordance with embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The components of embodiments of the present disclosure have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Embodiments of the present disclosure provide for a radiofrequency (RF) device having a partial slot antenna that renders the radiofrequency device to be selectively readable by a corresponding RF device. The partial slot antenna can be an incomplete slot antenna structure that inhibits the RF device from communicating with the corresponding RF device. When the partial slot antenna of the RF device is positioned proximate to a separate conductive element (i.e., separate and independent from the partial slot antenna), the separate conductive element can complete the slot antenna structure permitting the RF device to communicate with the corresponding RF device.

Embodiments of the RF device with the partial slot antenna can be used in a variety of different application and environments. As a non-limiting example, the RF device with the partial slot antenna can be implemented to determine a spatial relationship of the RF device to another object that includes the separate conductive element. The RF device can be disposed on a first structure and the separate conductive can be disposed on or be part of a second structure, where the first or second structure can be moveable relative to the other of the first or second structure and/or both structures can be moveable relative to each other. As one example, the RF device with the partial slot antenna can be disposed on a structure proximate to a door, lid, cover, or other moveable barrier and the separate conductive element can form part of the door, lid, cover, or other moveable barrier (or vice versa) and when the separate conductive element is disposed within a threshold distance of the partial slot antenna, the partial slot antenna of the RF device can permit RF communication to indicate that the door, lid, cover, or other moveable barrier is in an open position or a closed position depending on where the RF device is disposed. As another example, the RF device with the partial slot antenna can be disposed on one structure and the separate conductive element can be disposed on or form part of an autonomous mobile robot (or vice versa) such that when the separate conductive element is disposed within a threshold distance of the partial slot antenna of the RF device, the partial slot antenna of the RF device can permit RF communication to indicate a position of the autonomous mobile robot. As another non-limiting example, the RF device can be used for an application and/or environment that utilizes selective communication to facilitate one or more operations. As an example, the RF device with the partial slot antenna can be disposed on or part of an access card and the separate conductive element can be disposed proximate to a door, lid, cover, or other moveable barrier. When the partial slot antenna is disposed proximate to the separate conductive element, the partial slot antenna of the RF device can permit RF communication to allow the RF device to communicate an identifier associated with the access card, which can be used by the corresponding RF device or a computer operatively coupled to the corresponding RF device to authenticate the identifier. Upon authentication, a lock for the door, lid, cover, or other moveable barrier can be unlocked. While the above examples are illustrative of some non-limiting applications and/or environments within which the RF device with the partial slot antenna may be implemented, embodiments of the RF device can be implemented in other applications and/or environments.

In accordance with embodiments of the present disclosure, a selectively readable RFID tag/transponder (e.g., a type of RF device) is disclosed. The selectively readable RFID tag includes a partial slot antenna, an inductive loop disposed proximate to the partial slot antenna, and an electronic circuit. The electronic circuit is operatively coupled to the inductive loop to selectively respond to far-field radiofrequency communication based on a distance between the partial slot antenna and a separate electrically conductive element.

In accordance with embodiments of the present disclosure, a method of forming a selectively readable RFID tag is disclosed. The method includes forming a partial slot antenna; positioning an inductive loop proximate to the partial slot antenna; and operatively coupling an electronic circuit to the inductive loop. The partial slot antenna inhibits the electronic circuit from responding to a far-field radiofrequency communication when a separate conductive element in an environment surrounding the partial slot antenna is positioned greater than a threshold distance away from the partial slot antenna.

In accordance with embodiments of the present disclosure, a system for detecting a spatial relationship of structures in an environment is disclosed. The system includes a RFID tag having a partial slot antenna and a RFID reader disposed greater than a specified distance away from the far-field RFID tag and within a communication range of the RFID tag. The RFID tag has a non-readable state and a readable state and the RFID reader attempts to communicate with the selectively readable RFID tag using far-field radiofrequency communication.

In accordance with embodiments of the present disclosure, a method of detecting a state of a moveable barrier is disclosed. The method includes positioning a selectively readable RFID tag including a partial slot antenna proximate to the moveable barrier or on the moveable barrier, enabling or inhibiting a response of the selectively readable RFID tag to a far-field radiofrequency communication based on whether the moveable barrier is in the open position or the closed position, and determining whether the moveable barrier is in the open position or the closed position based on a presence or absence of the response from the RFID tag.

In accordance with embodiments of the present disclosure, the partial slot antenna inhibits responding to the far-field radiofrequency communication when the distance between the separate conductive element and the partial slot antenna is greater than a threshold distance and enables responding to the far-field radiofrequency communication when the distance between the separate conductive element and the partial slot antenna is less than the threshold distance.

In accordance with embodiments of the present disclosure, the partial slot antenna can have an incomplete antenna structure that inhibits responding to the far-field radiofrequency communication. The incomplete antenna structure of the partial slot antenna can be completed in response to the conductive element being positioned less than the threshold distance away from the incomplete structure of the partial slot antenna and completion of the incomplete structure of the partial slot antenna enables responding to the far-field radiofrequency communication.

In accordance with embodiments of the present disclosure, the partial slot antenna can include a planar electrically conductive element and a slot formed in the planar conductive element. The slot can be formed to have at least one open end and/or can have a length that is one half or one quarter of a wavelength of the far-field radiofrequency communication.

In accordance with embodiments of the present disclosure, the inductive loop can be positioned in the slot proximate to the at least one open end and/or the inductive loop can be oriented to position a portion of the inductive loop flush with the at least one open end of the slot.

In accordance with embodiments of the present disclosure, the partial slot antenna, the inductive loop, and/or the electronic circuit can be positioned on an electrically non-conductive substrate.

In accordance with embodiments of the present disclosure, the partial slot antenna is disposed at least one of (i) proximate to a moveable barrier and at least a portion of the moveable barrier includes the separate conductive element such that when the moveable barrier is in an open or a closed position, the separate conductive element is within a threshold distance of the partial slot antenna enabling the RFID tag to respond to the far-field radiofrequency communication; or (ii) on the moveable barrier and the separate conductive element is positioned within the threshold distance when the moveable barrier is in the open position or the closed position enabling the RFID tag to respond to the far-field radiofrequency communication.

In accordance with embodiments of the present disclosure, in response to opening or closing the moveable barrier, the partial slot antenna can be positioned within a threshold distance of the separate conductive element to enable the selectively readable RFID tag to respond to the radiofrequency communication.

In accordance with embodiments of the present disclosure, the RFID reader or a computing device in communication with the RFID reader determines whether the RFID tag is in the non-readable state or the readable state based on whether an identifier of the selectively readable RFID tag is received in response to far-field radiofrequency communication from the RFID reader.

Embodiments of the RF device of the present disclosure has several advantages over sensor technologies. As one example, embodiments of the RF device can be operative without requiring wiring to another device, without requiring its own power source, and without requiring battery recharging or replacing batteries. With respect to the latter, embodiments of the RF device can use inductive coupling to harness the power in the RF communication from a corresponding RF device such that embodiments of the RF device can be utilized in areas and/or for applications where a requirement of power source is undesirable and/or impractical. Furthermore, for environments and/or application that already utilize RF devices, the addition of embodiments of the RF device of the present disclosure can be easily integrated into the environments and/or system with little to no reconfiguration of the architecture within which the RF device operate. Embodiments of the RF device can operate without additional sensor technology. As an example, if embodiments of the RF device are deployed in an environment that is already using other compatible RF devices (RFID readers and RFID tag), an Internet of Things (IoT) gateway may not be required to sense the status or state of an object associated with the RF device in the environment. Furthermore, the architecture of a RFID locationing engine in RFID applications is simplified. Instead of having to fuse RFID communication with, for example, BLE or other communication protocols to gain contextual awareness in the environment, the RFID locationing engine can simply listen for RFID communication of embodiments of the RF device while it is also listening for other RFID tags in the environment. Additionally, unlike conventional Hall Effect sensors that are commonly used for sensing whether a moveable barrier is open or closed, embodiments of the present disclosure do not utilize a trigger magnet. In an industrial environment, the magnets utilized for the Hall Effect sensors can be damaged. A damaged trigger magnet can render the sensor inoperable and require maintenance to identify and replace the damaged magnet.

Figure 1B:
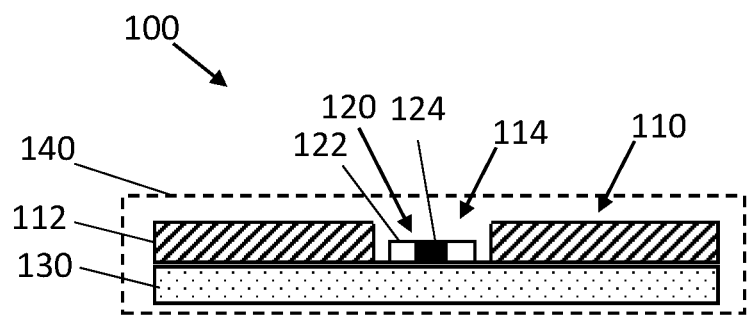
FIG. 1B is a schematic cross-sectional view of the example RFID tag with the partial slot antenna along line A-A in FIG. 1.

FIG. 1A is a schematic plan view of an example RF device in accordance with embodiments of the present disclosure and FIG. 1B is a cross-sectional view of a profile of the RF device along line A-A in FIG. 1A. As shown in FIGS. 1A-B, the RF device can be a radiofrequency identifier (RFID) tag/transponder 100. The RFID tag 100 includes a partial slot antenna 110 and an RFID component 120 that can be disposed on a substrate 130 and contained in a housing 140. While the housing 140 is shown as encompassing the partial slot antenna 110, the RF component 120, and the substrate 130, embodiments of the RFID tag 100 may be devoid of the housing 140 or the housing 140 may encapsulate the RFID component 120 without covering or completing covering the partial slot antenna 110 and/or the substrate 130. The substrate 130 and/or housing 140 can be an electrically non-conductive and/or non-ferrous material. The RFID component 120 includes an inductive loop 122 and an electronic circuit 124. The RFID tag 100 can be selectively readable as described herein by a corresponding radiofrequency device, such as an RFID reader/interrogator. The RFID tag 100 can be an ultra-high frequency (UHF) RFID tag configured for far-field radiofrequency communication (e.g., in a frequency range of approximately 860 MHz to approximately 960 MHz). As a non-limiting example, the RFID tag 100 can be configured according to one or more proprietary schemes and/or according to one or more standards, such as ISO 18000-6A, ISO 18000-6B, ISO 18000-6C, ISO/IEC 29143, and/or other standards. While the RF device is illustrated as the RFID tag 100 that can selectively communicate with a corresponding RF device in the form of an RFID reader, embodiments of the RF device can be implemented as other types of RF devices and the corresponding radiofrequency device can be other types of corresponding RF devices.

The partial slot antenna 110 can be an incomplete slot antenna structure that inhibits the RFID tag 100 from responding to far-field communication from a RFID reader at a specified frequency or frequency range. The partial slot antenna 110 can include an electrically conductive element 112 and a slot 114 formed in or by the electrically conductive element 112. The conductive element 112 and the slot 114 can have an area where the conductive element 112 at least partially encompasses the slot 114. The conductive element 112 can be a unitary structure or can be formed from two or more discrete conductive elements. As shown in FIGS. 1A-B, the conductive element 112 can be formed from an electrically conductive material, such as metal, and can have a planar structure that is disposed on the substrate 130, which can be an electrically non-conductive material and/or non-ferrous material. The inductive loop 122 of the RF component 120 can be disposed in the slot 114 such that the inductive loop 122 is coplanar with the conductive element 112 of the partial slot antenna 110. In some embodiments, the inductive loop 122 can be offset to reside in a different plane that is parallel to the plane defined by the conductive element 112. For example, relative to the orientation shown in FIG. 1B, the inductive loop 122 can be aligned with the slot but disposed in a plane that is above or below the plane of defined by the conductive element 112 such that the inductive loop 122 and the conductive element 112 are vertical offset from each other relative to the orientation shown in FIG. 1B.

Figure 3A:
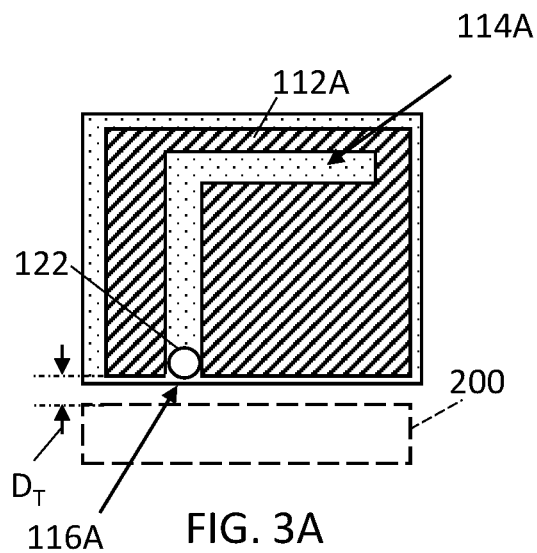
FIG. 3A-E are schematic views illustrating various example slot configurations of example RFID tags with partial slot antennas in accordance with embodiments of the present disclosure.
Figure 3B:
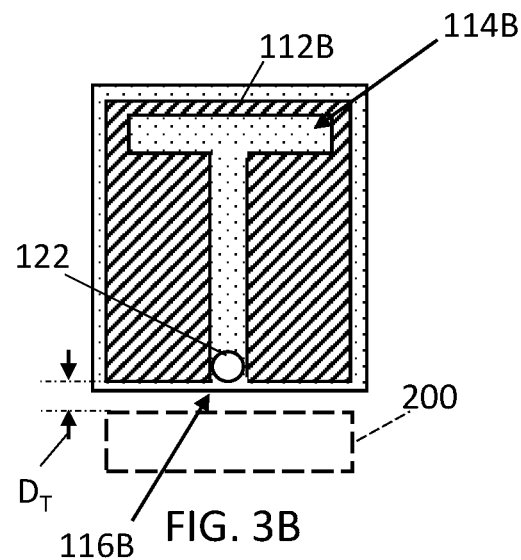
Figure 3C:
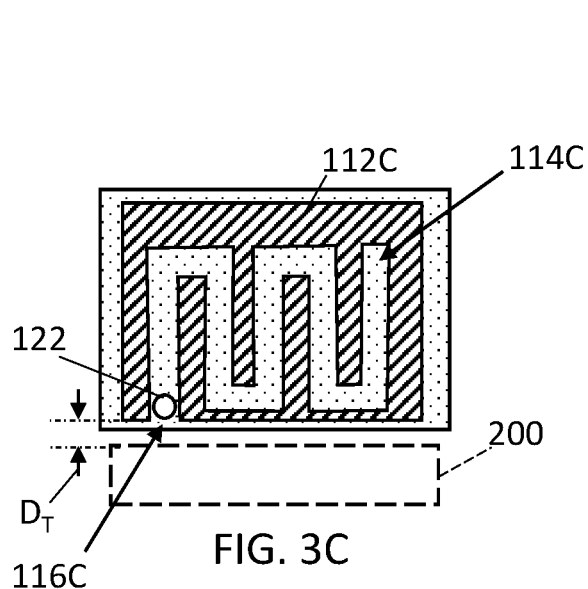
Figure 3D:
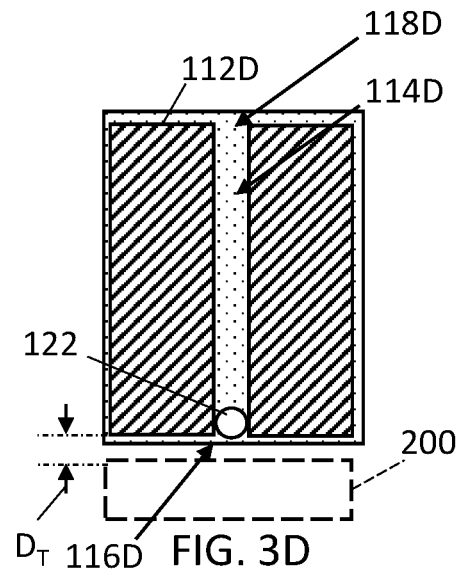
Figure 3E:
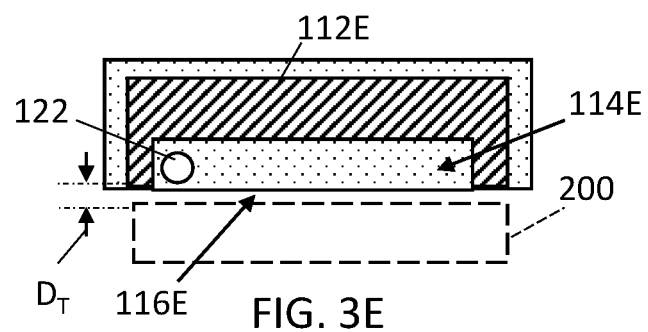

The slot 114 is devoid of the conductive material of the conductive element 112 and the conductive material of the conductive element 112 can be disposed on two or more sides 102 of the slot 114 (the example slot 112 shown in FIG. 1A is surrounded by the conductive element 112 on three sides 102A-C). A proximal end 116 of the slot 112 can form an open end such that the proximal end 116 is not encompassed by the conductive element 112. The slot 114 can have a variety of different linear configurations, nonlinear configurations, symmetrical configurations, non-symmetrical configurations, and/or other configurations. As an example, FIGS. 1A-B illustrates the slot 114 as a straight, linear, and uniform rectangular area within the area of the conductive element 112 having a slot length $L_S$ and a slot width $W_S$ such that the conductive element 112 has a U-shape, while FIG. 3A illustrates an L-shaped slot 114A relative to a conductive element 112A, FIG. 3B illustrates a T-shaped slot 114B relative to a conductive element 112B, FIG. 3C illustrates a serpentine shaped slot 114C relative to a conductive element 112C, FIG. 3D illustrates a slot 114D relative to a conductive element 112D, where the slot 114D has a first open end at the proximal end 116D of the slot 114D and a second open end at distal end 118D of the slot 114D, and FIG. 3E illustrates a slot 114E formed relative to the conductive element 112E having an open side end formed along the length of slot 114E such that the inductive loop is disposed proximate to a first side of the conductive element 112E and an adjacent second side of the conductive element 112E. Unless other stated herein, the slot configurations of the partial slot antennas illustrated in FIGS. 3A-E can be interchangeable with the slot configuration of the partial antenna illustrated in FIG. 1 and it should be understood that reference to the RFID tag 100 herein encompasses any of the slot configurations described herein. While certain slot configurations have been illustrated, different slot configurations can be implemented in accordance with embodiments of the present disclosure. The slot length $L_S$ can be specified based on a wavelength of the radiofrequency communication to be received and/or transmitted by the RFID tag 100. As an example, the slot length $L_S$ can be equal to the wavelength, a fraction of the wavelength, such as three quarters of the wavelength, one half of the wavelength, one quarter of the wavelength, one eighth of the wavelength, or other fractions of the wavelength.

The slot width $W_S$ of the slot 114 can be uniform or non-uniform. The slot width $W_S$ at the proximal end 116 of the slot 114 can be specified, for example, based on a width $W_{RF}$ of the inductive loop 122 of the RFID component 120 measured along the proximal end 116 of the slot 114. As an example, the slot width $W_S$ can be greater than the width $W_{RF}$, such that a first gap is formed between the conductive element 112 and the inductive loop 122 of the RF component 120 on a first side of the slot 114 having a first gap width $W_{G1}$ and a second gap is formed between the conductive element 112 and the inductive loop 122 of the RF component 120 on a second opposing side of the slot 114 having a second gap width $W_{G2}$. The inductive loop 122 can be positioned symmetrically relative to the slot 114 such that the first and second gap widths $W_{G1}$ and $W_{G2}$ are equal or can be positioned asymmetrical relative to the slot 114 such that the first gap width $W_{G1}$ is greater or less than the second gap width $W_{G2}$. The first and/or second gaps between the inductive loop 122 and the first and second opposing sides 102A and 102B of the conductive element 112 improve an operation of the RFID tag 100 to inhibit a response to a far-field radiofrequency communication with the partial slot antenna 110. In some embodiments, the slot width $W_S$ can be equal to or less than the width $W_{RF}$ of the inductive loop 122. Additionally or alternatively, the first gap width $W_{G1}$ and/or the second gap width $W_{G2}$ can be zero such that the inductive loop 122 overlaps the conductive element 112 on one or two sides of the inductive loop 122, e.g., when the inductive loop is asymmetrically positioned relative to the slot 114 or for embodiments in which the slot width $W_S$ is equal to or less than the width $W_{RF}$ of the inductive loop 122.

As shown in FIG. 1A, the inductive loop 122 is disposed at the proximal end 116 of the slot 114. A portion of the inductive loop 122 can be aligned to be flush with the proximal end 116 of the slot 114. In some embodiments, the inductive loop 122 can be offset inwardly into the slot 114 relative to the proximal end 116 such that the portion of the inductive loop 122 is spaced away from the proximal end 116 of the slot 114. In some embodiments, the inductive loop 122 can be disposed at different locations along the length $L_S$ of the slot 114 (e.g., such as at the terminal or distal end 118 of the slot 114).

Figure 1C:
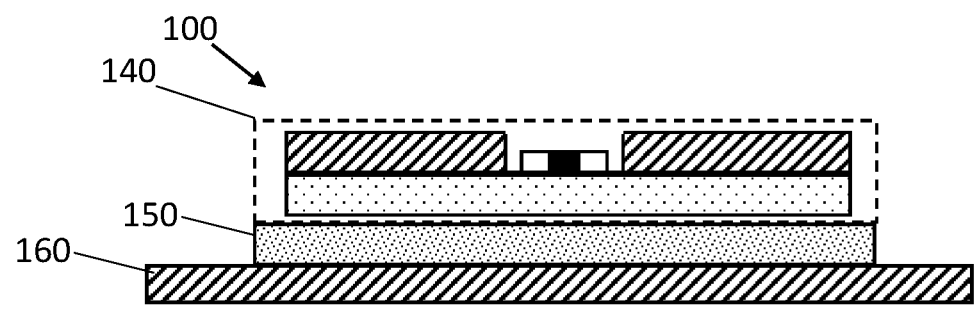
FIG. 1C is a schematic cross-sectional view of the example RFID tag with the partial slot antenna along line A-A of FIG. 1 with a dielectric material and a reflector in accordance with embodiments of the present disclosure.
Figure 1D:
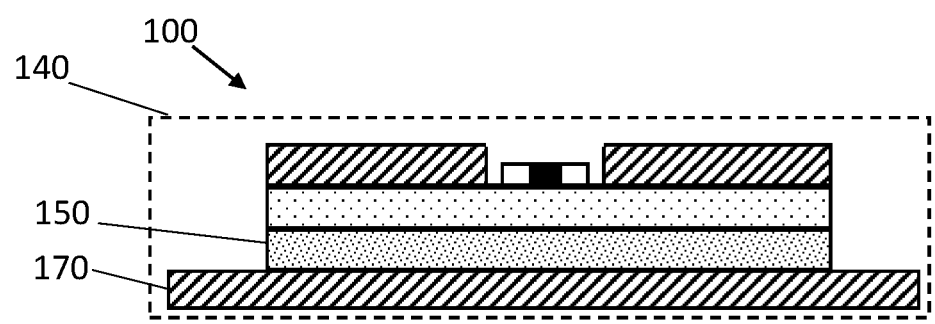
FIG. 1D is a schematic cross-sectional view of the example RFID tag with the partial slot antenna having a dielectric material and a reflector integrated into a housing of the example RFID tag with partial slot antenna in accordance with embodiments of the present disclosure.

FIGS. 1C and 1D are illustrative of embodiments of the RFID tag 100 that includes a dielectric material 150 and/or a reflector 160. FIG. 1C shows the dielectric material 150 and/or reflector 160 can be disposed outside of the housing 140, while FIG. 1D shows the dielectric material 150 and/or reflector 160 can be disposed inside the housing 140. While both the dielectric material 150 and the reflector 160 are outside of the housing in FIG. 1C and are inside the housing in FIG. 1D, the dielectric material 150 can be inside the housing 140 and the reflector 160 can be outside of the housing (or vice versa). The dielectric material 150 can be a dielectric pad that prevents or reduces an effect of mounting the RFID tag 100 on an electrically conductive and/or ferrous surface (e.g., detuning of the RFID tag 100). The reflector 160 can be an electrically conductive and/or ferrous material that can redirect or reflect electromagnetic waves towards the partial slot antenna 110. The reflector 160 can increase an operational RF communication range of the RFID tag 100.

The electronic circuit 124 can be electrically connected to the inductive loop 122. The electronic circuit 124 can be operative to respond to a far-field radiofrequency communication via the inductive loop 122 when the partial slot antenna 110 is completed by a separate conductive element as described herein. The RFID tag 100 can be a passive RFID tag and the inductive loop 122 can power the electronic circuit 124 via inductive coupling. The electronic circuit 124 can be devoid of any feed lines or any wired connection to the partial slot antenna 110 such that the electronic circuit 124 does not directly drive the partial slot antenna 110 or directly receive electric current from the partial slot antenna 110. Rather, the partial slot antenna 110 can aid in inducing an electric current in the inductive loop 122 in response to radiofrequency waves when a separate conductive element is disposed within a threshold distance of the partial slot antenna 110 as described herein. An example electronic circuit 124 is described herein with reference to FIG. 4.

Figure 2A:
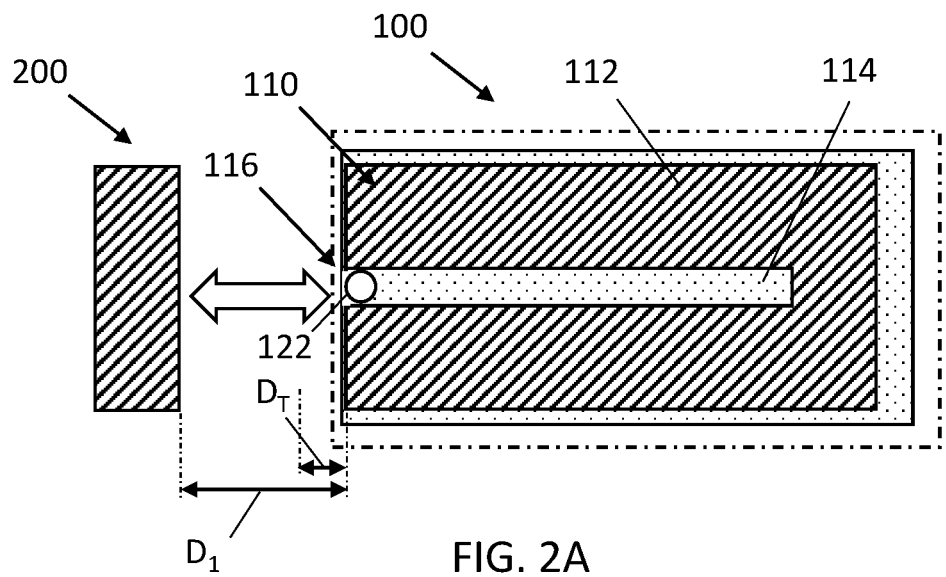
FIG. 2A-B are schematic cross-sectional views of the example RFID tag with the partial slot antenna interacting with a separate conductive material in accordance with embodiments of the present disclosure.
Figure 2B:
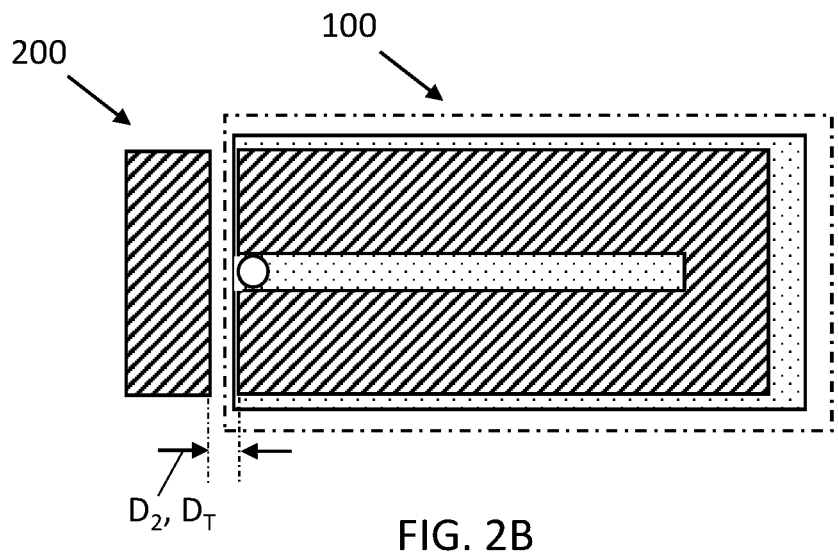

FIGS. 2A-B illustrate an operation of an embodiment of the RFID tag 100 in connection with a separate conductor 200 in accordance with embodiments of the present disclosure. The separate conductive element 200 can be an electrically conductive element that is a separate, independent, and/or discrete structure from the conductive element 112 of the partial slot antenna 110 and/or the separate conductive element 200 and/or the conductive element 112 can be moveable with respect to each other. The inductive loop 122 can be disposed proximate to the proximal end 116 of the slot 114. As shown in FIG. 2A, the conductive element 200 can be disposed a distance $D_1$ away from the partial slot antenna 110, which is greater than a threshold distance $D_T$. As shown in FIG. 2B, the separate conductive element 200 can be disposed a distance $D_2$ away from the partial slot antenna 110, which is less than or equal to the threshold distance $D_T$. Particularly, the separate conductive element 200 can be disposed the distance $D_1$ away from the proximal end 116 of the slot 114 and proximal ends of the conductive element 112 in FIG. 2A and can be disposed the distance $D_2$ away from the proximal end 116 of the slot 114 and proximal ends of the conductive element 112 in FIG. 2B. The distance between the partial slot antenna 110 and the separate conductive element 200 can affect an operation of the RFID tag 100. As an example, when the separate conductive element 200 is more than the threshold distance $D_T$ away from the proximal end 116 of the slot 114 (FIG. 2A), the partial slot antenna 110 inhibits the RFID tag 100 from responding to a far-field radiofrequency communication from an RFID reader and when the separate conductive element 200 is less than or equal to the threshold distance $D_T$ away from the proximal end 116 of the slot 114 (FIG. 2B), a combination of the partial slot antenna 110 and the separate conductive element 200 can permit the RFID tag 100 to respond to the far-field radio frequency communication from an RFID reader. The threshold distance $D_T$ can vary based on a configuration of the RFID tag 100, such as a configuration of the slot antenna 110, spatial relationship of the inductive loop 122 relative to the proximal end 116, a spatial relationship of the inductive loop 122 to the conductive element 112 of the partial slot antenna 110, and/or other attributes of the RFID tag 100. As a non-limiting example, the threshold distance $D_T$ can be between approximately 0 and approximately one inch or between approximately zero and approximately one half inch.

While an example embodiment of the slot 114 has been shown in FIGS. 2A-B, other slot configurations can be implemented in combination with the separate conductive element 200 in the same manner as described with reference to FIGS. 2A-B. As an example, conductive elements 112A-E and slots 114A-E shown in FIGS. 3A-E, respectively, can interact with the separate conductive element 200 based on whether the separate conductive element 200 is within the threshold distance, Dr, to the proximal open ends 116A-E of the slots 114A-E, respectively. As an example, when the separate conductive element 200 is more than the threshold distance $D_T$ away from the proximal ends 116A-E of the slot 114A-E, respectively, the partial slot antenna inhibits responding to a far-field radio frequency communication from an RFID reader and when the separate conductive element 200 is less than or equal to the threshold distance $D_T$ away from the proximal ends 116A-E of the slot 114A-E, respectively, a combination of the partial slot antenna and the separate conductive element 200 can permit responding to the far-field radio frequency communication from an RFID reader.

Figure 4:
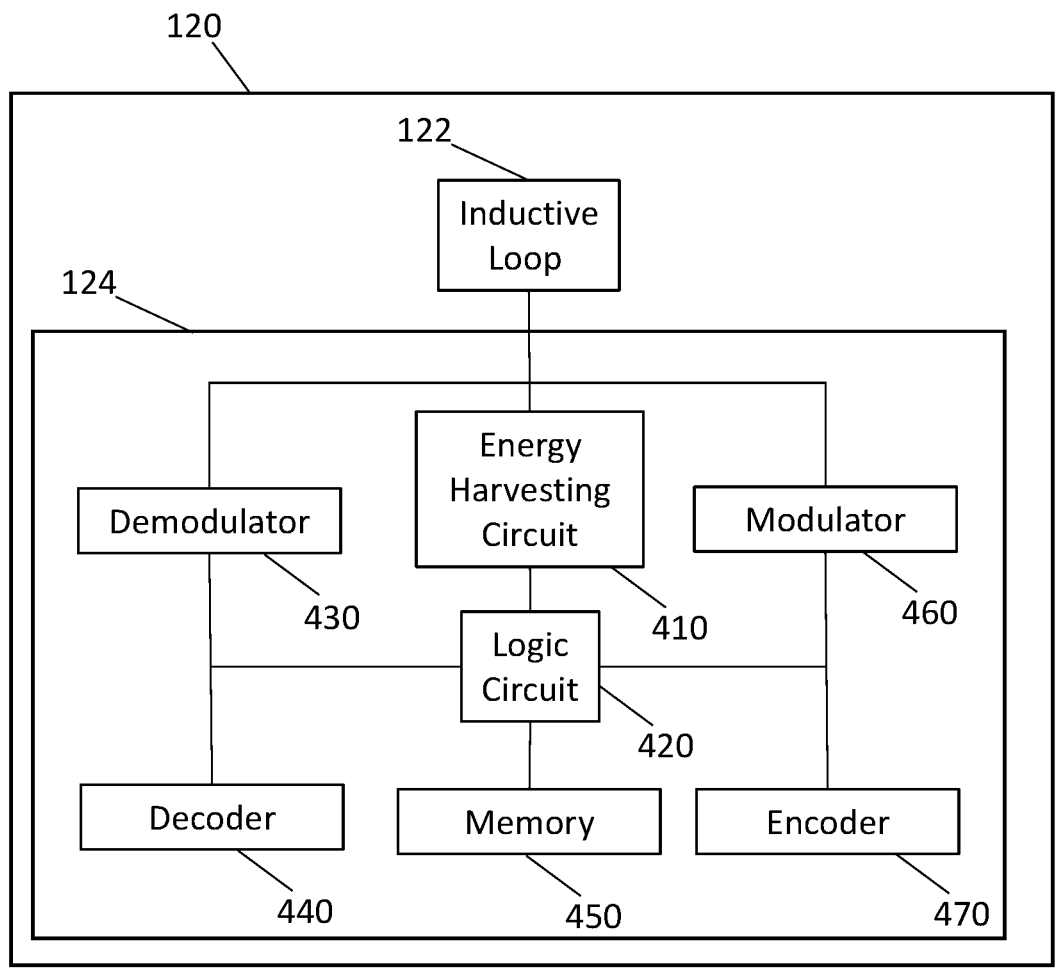
FIG. 4 is an example block diagram of an RFID component of the RFID tag with the partial slot antenna in accordance with embodiments of the present disclosure.

FIG. 4 is a block diagram of the RF component 120 including the inductive loop 122 and the electronic circuit 124 in accordance with embodiments of the present disclosure. As shown in FIG. 4, the electronic circuit 124 of the RF component 120 can include an energy harvesting circuit 410, a logic circuit 420, a demodulator 430, a decoder 440, memory 450, a modulator 460, and an encoder 470. As a non-limiting example, the electronic circuit 124 can be implemented as one or more integrated and/or discrete circuits.

The memory 450 is a non-transitory computer-readable medium that can include volatile (e.g., RAM) and/or non-volatile memory (e.g., EEPROM). The memory 450 can store data, including an identifier, which can be used in a system to identify and distinguish the RFID tag 100 from other RFID tags in a system and can also be used to associate the RFID tag 100 with an object in the system. In an example embodiment, the identifier can be a string of alphanumeric characters. The RFID tag 100 can be associated with an object upon which RFID tag 100 is disposed or of which the RFID tag 100 is a component, can be associated with an object upon which the separate conductive element 200 is disposed or of which the separate conductive element 200 is a component, and/or can be associated with an object that does not include the RFID tag 100 or the separate conductive element 200. For example, when RFID tag 100 is interrogated by an RFID reader, the RFID tag 100 may respond with the stored identifier to identify itself and the RFID reader and/or other devices can use the association between the identifier and the object to determine information about the object, such as a status or state of the object, and/or the RFID reader and/or other devices can perform one or more operations based on the receipt of the identifier and/or the information determined about the object based on the identifier.

When an embodiment of the selectively readable RFID tag 100 is in the readable state, radio waves of the far-field radiofrequency communication emitted by the RFID reader can generate a time varying electromagnetic field around the combination of the partial slot antenna 110 and separate conductive element 200, which in turn can induce, via inductive coupling, an electrical signal (e.g., an electric current) in the inductive loop 112. The electrical signal can be processed by the energy harvesting circuit 410 to generate a power supply voltage to power the components of the electronic circuit 124. For example, the energy harvesting circuit 410 receives the electrical signal from the inductive loop 122 and converts the electrical signal to a direct current voltage. The energy harvesting circuit 410 can include, for example, a charge pump, voltage converter, voltage regulator, and/or other circuitry. The electrical signal can also include information that can be demodulated by the demodulator 430 and decoded by the decoder 440. The decoded electrical signal can be received as an input by the logic circuit 420 from the decoder 440.

In response to receipt of the decoded electrical signal, the logic circuit 420 can retrieve data from the memory 450 (e.g., the identifier) and output the data to the encoder 470. The logic circuit 420 can include software, firmware, and/or hardware, or any combination thereof to facilitate the operations performed by the logic circuit 420. For example, the logic circuit 420 can include digital circuitry, such as logic gates. The encoder 470 can encode the data from the logic circuit 420 and output the encoded data to the modulator 460, which can modulate the encoded data and output the modulated data to the inductive loop 122, which can, in combination with the partial slot antenna 110 and the separate conductive element 200 can modulate the modulated signal onto the far-field radiofrequency communication received by the RFID tag 100 from the RFID reader.

While an example embodiment of the RF component 120 has been illustrated in FIG. 4, embodiments of the RF component 120 can include more, fewer, and/or different components. As an example, the RF component 120 can include any number of energy harvesting circuits, demodulators, decoders, logic circuits, encoders, and modulators.

Figure 5:
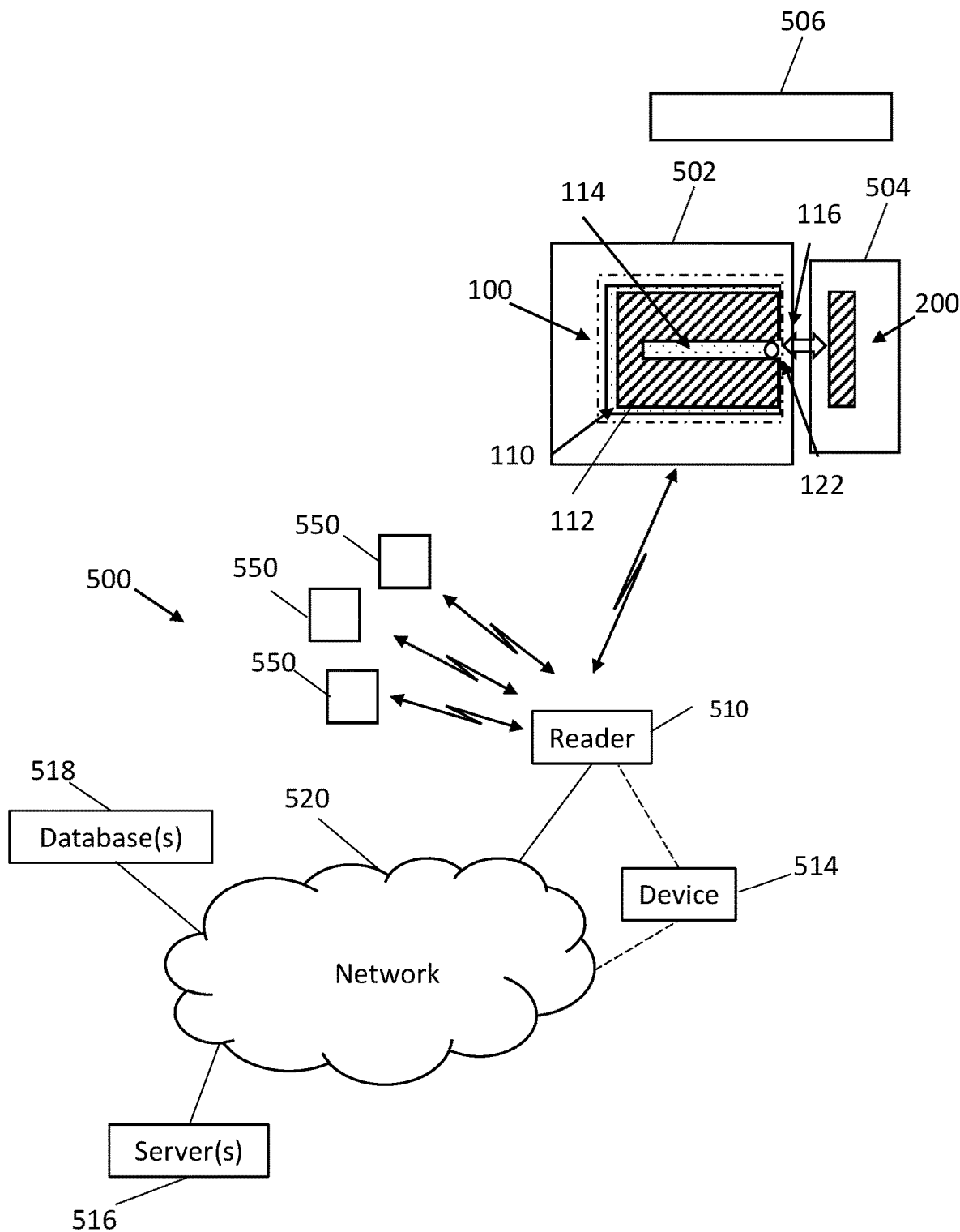
FIG. 5 is an example network environment including an example RFID tag with a partial slot antenna in accordance with embodiments of the present disclosure.

FIG. 5 is an example network environment 500 including example embodiments of the RFID tag 100 with the partial slot antenna 110 in accordance with embodiments of the present disclosure. The network environment 500 can include far-field RFID reader 510, a computing device 514, one or more servers 516, and one or more data repositories, illustrated as database(s) 518, and a network 520. The network 520 can be implemented as the Internet, an Intranet, virtual private network (VPN), wide area network (WAN), local area network (LAN), a cellular network, a mesh or ad-hoc network, and/or other suitable network. The RFID reader 510 can be configured to communicate with the computing device 514 and/or the network 520 via wired or wireless communication. The one or more servers 516 can also be embodied as computing devices. The computing device 514 and/or server 516 can be embodied by an example computing device 600 described herein with reference to FIG. 6. The computing device 514 and one or more servers 516 can include one or more processors and non-transitory computer-readable media. The non-transitory computer-readable media can store instructions and the one or more processors can be programmed to execute the instructions to perform one or more operations. The database(s) 518 can store data for use by the computing device 514, servers 516, and/or reader 510. As an example, the database(s) 518 can store information about object(s), the identifier of the RFID tag 100, and associations between the object(s) and the identifier. As an example, the database(s) 518 can store a location of objects 502, 504, and/or 506 associated with the RFID tag 100, a state or status of the objects 502, 504, and/or 506, one or more operations to be performed based on the identifier of the RFID tag 100 and/or a state or status of the objects 502, 504, and/or 506 associated with the RFID tag 100, a name or identifier of the objects 502, 504, and/or 506, a relationship between the RFID tag 100 and the objects 502, 504, and/or 506, and/or can store other information. The database(s) 518 can associate the RFID tag 100 with the object 502 upon which RFID tag 100 is disposed or of which the RFID tag 100 is a component, the object 504 upon which the separate conductive element 200 is disposed or of which the separate conductive element 200 is a component, and/or the object 506 that is separate from the RFID tag 100 and the separate conductive element 200 (e.g., the RFID tag 100 and the separate conductive element 200 are not disposed on or do not form part of the object 506).

The RFID reader 510 is disposed at a specified distance away from the RFID tag 100. For example, the RFID reader 510 can be spaced away from the RFID tag 100 to facilitate far-field radiofrequency communication (e.g., RFID reader 510 can be greater than twelve inches, two feet, three feet, four feet, five feet, six feet, seven feet, eight feet, or more from the RFID tag 100). The RFID reader 510 can attempt to interrogate the RFID tag 100 by emitting a far-field radiofrequency communication. The RFID tag 100 can be within a communication range of the RFID reader 510. As described herein, the RFID tag 100 can be selectively readable such that the RFID tag 100 can be unresponsive to the interrogation attempt from the RFID reader 510 when the separate conductor 200 is greater than the threshold distance away from the partial slot antenna of the RFID tags 100 (e.g., when the separate conductor 200 is greater than the threshold distance away from the proximal end 116 of the slot 114 of the RFID tags 100) and can be responsive to the interrogation attempt from the RFID reader 510 when the separate conductor 200 is less than the threshold distance away from the partial slot antenna 110 of the RFID tag 100 (e.g., when the separate conductor 200 is less than the threshold distance away from the proximal end 116 of the slot 114 of the RFID tag 100).

The RFID reader 510 can perform one or more operations in response to failing to receive a response from the RFID tag 100 and/or can perform one or more operations in response to successfully receiving a response from the RFID tag 100. As one example, the RFID reader 510 can determine a status or state of the objects 502, 504, and/or 506 associated with the RFID tag 100 based on the responsiveness of the RFID tag 100 and can communicate the status to the computing device 514 and/or the server 516. As another example, the reader 510 can communicate a message to the computing device 514 and/or the server(s) 516 when the interrogation signal is emitted, when the RFID tag 100 is unresponsive, and/or when the RFID tag 100 is responsive to the interrogation signal and the computing device 514 and/or the server 516 can determine a status or state of the objects 502, 504, and/or 506 associated with the RFID tag 100 based on a responsiveness of the RFID tag 100. As another example, there can be several RFID tags 550 within range of the RFID reader 510 in addition to the RFID tag 100. After the RFID reader 510 emits the interrogation signal, the RFID reader 510 can receive responses from the other RFID tags 550 and may or may not receive a response from the RFID tag 100 as described herein. The RFID reader 510 can transmit the identifiers of the RFID tags that responded to the computing device 514 and/or the server 516 and the computing device 514 and/or the server 516 can determine whether the identifier for the RFID tag 100 is included as one of the identifiers received from the RFID reader 510. Based on whether or not the computing device 514 and/or server 516 received the identifier of the RFID tag 100, the computing device 514 and/or server 516 can determine a status or state of the objects 502, 504, and/or 506 associated with the RFID tag 100.

As described herein, as an example, the RFID tag 100 can be implemented to determine a spatial relationship of the RFID tag 100 to the separate conductive element 200. The RFID tag 100 can be disposed on or be part of the object 502 and the separate conductive 200 can be disposed on or be part of the object 504, where one of the objects 502 or 504 can be moveable relative to the other one of the objects 502 or 504 and/or both objects 502 and 504 can be moveable relative to each other. As one example, the RFID tag 100 with the partial slot antenna 110 can be disposed on a structure (object 502) proximate to a door, lid, cover, or other moveable barrier and the separate conductive element 200 can form part of the door, lid, cover, or other moveable barrier (object 504) (or vice versa) and when the separate conductive element 200 is disposed within a threshold distance of the partial slot antenna 110, the RFID tag 100 can respond to the far-field interrogation signal from the RFID reader 510 by providing the identifier to the RFID reader 510, and the RFID reader 510, the computing device 514, and/or server 516 can determine, based on the responsiveness of the RFID tag 100, whether the door, lid, cover, or other moveable barrier (object 504) is in an open position or a closed position depending on where the RFID tag 100 is disposed. As another example, the RFID tag 100 with the partial slot antenna 110 can be disposed on one structure (object 502) and the separate conductive element 200 can be disposed on or form part of an autonomous mobile robot (object 504) (or vice versa) such that when the separate conductive element 200 is disposed within the threshold distance of the partial slot antenna 110 of the RFID tag 100, the RFID tag 100 can respond to the far-field interrogation signal from the RFID reader 510 by providing the identifier to the RFID reader 510, and the RFID reader 510, the computing device 514, and/or server 516 can determine or verify, based on the responsiveness of the RFID tag 100, a position of the autonomous mobile robot (object 504). As another non-limiting example, the RFID tag 100 can be disposed on or part of an access card (object 502) and the separate conductive element 200 can be disposed on or proximate to a door, lid, cover, or other moveable barrier (object 504). When the partial slot antenna of the RFID tag 100 is disposed within the threshold distance to the separate conductive element 200, the RFID tag 100 can respond to the far-field interrogation signal from the RFID reader 510 by providing the identifier to the RFID reader 510, and the RFID reader 510, the computing device 514, and/or server 516 can authenticate the identifier and unlock a lock (object 506) of the door, lid, cover, or other moveable barrier. While the above examples are illustrative of some non-limiting applications and/or environments within which embodiments of the RFID tag 100 with the partial slot antenna 110 may be implemented, embodiments of the RFID tag 100 can be implemented in other applications and/or environments.

Figure 6:
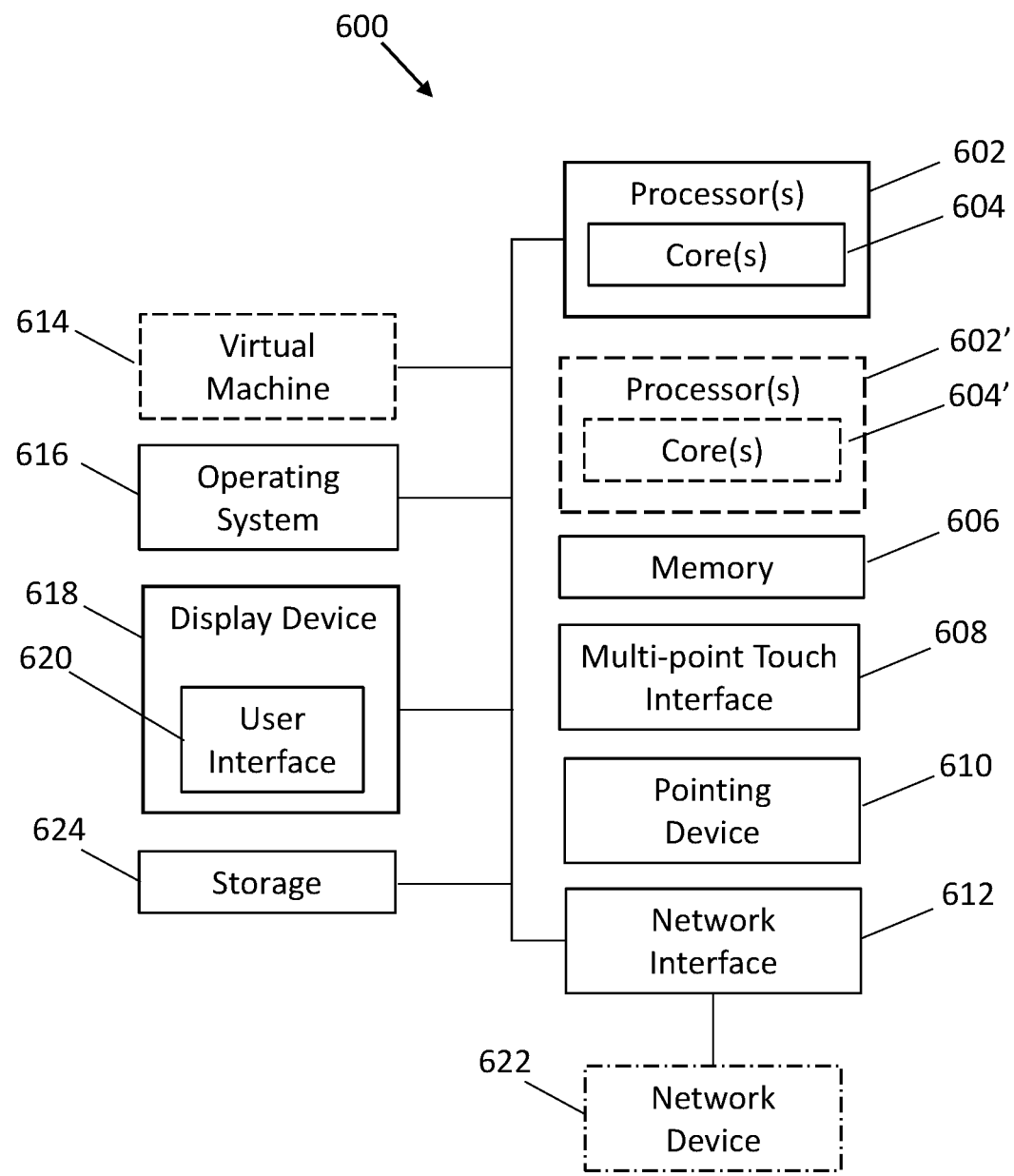
FIG. 6 is a block diagram of an example computing device in accordance with the present disclosure.

FIG. 6 is a block diagram of an exemplary computing device 600 that may be used to implement exemplary embodiments of the present disclosure. The computing device 600 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 606 included in the computing device 600 may store computer-readable and computer-executable instructions or software for implementing exemplary embodiments of described herein. The computing device 600 also includes configurable and/or programmable processor 602 and associated core 604, and optionally, one or more additional configurable and/or programmable processor(s) 602' and associated core(s) 404' (for example, in the case of computer systems having multiple processors/cores), for executing computer-readable and computer-executable instructions or software stored in the memory 606 and other programs for controlling system hardware. Processor 602 and processor(s) 602' may each be a single core processor or multiple core (604 and 604') processor.

Memory 606 may include a computer system memory or random-access memory, such as DRAM, SRAM, EDO RAM, and the like. Memory 606 may include other types of memory as well, or combinations thereof.

A user may interact with the computing device 600 through a visual display device 618, such as a computer monitor, which may display one or more user interfaces 620 that may be provided in accordance with exemplary embodiments. The computing device 600 may include other I/O devices for receiving input from a user, for example, a keyboard or any suitable multi-point touch interface (e.g., keyboard) 608, a pointing device 610 (e.g., a mouse). The keyboard 608 and the pointing device 610 may be coupled to the visual display device 618. The computing device 600 may exclude I/O peripherals or may include other suitable conventional I/O peripherals.

The computing device 600 may also include one or more storage devices 624, such as a hard-drive, CD-ROM, or other computer readable media, for storing data and computer-readable instructions and/or software that implement exemplary embodiments of described herein. Exemplary storage device 624 may also store information used to implement example embodiments, such as information about object(s), the identifier of the RFID tag 100, and associations between the object(s) and the identifier. As an example, the storage device 624 can store a location of object(s) associated with the RFID tag 100, a state or status of the object(s), one or more operations to be performed based on the identifier of the RFID tag 100 and/or a state or status of the object(s) associated with the RFID tag 100, a name or identifier of the object(s), a relationship between the RFID tag 100 and the object(s), and/or can store other information. Additionally or in the alternative, the computing device 600 can also communicate with a database (e.g., database 518) that stores information, such as information about object(s), the identifier of the RFID tag 100, and associations between the object(s) and the identifier.

The computing device 600 can include a network interface 612 configured to interface via one or more network devices 622 with one or more networks (e.g., network 520), such as the Internet, an Intranet, virtual private network (VPN), wide area network (WAN), local area network (LAN), a cellular network, a mesh or ad-hoc network, and/or other suitable communication network, or some combination of any or all of the above. The network interface 612 may include a built-in network adapter, network interface card, PCMCIA network card, card bus network adapter, wireless network adapter, USB network adapter, modem or any other device suitable for interfacing the computing device 600 to any type of network capable of communication and performing the operations described herein. Moreover, the computing device 600 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 600 may run any operating system 616, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 616 may be run in native mode or emulated mode. In an exemplary embodiment, the operating system 616 may be run on one or more cloud machine instances.

Figure 7A:
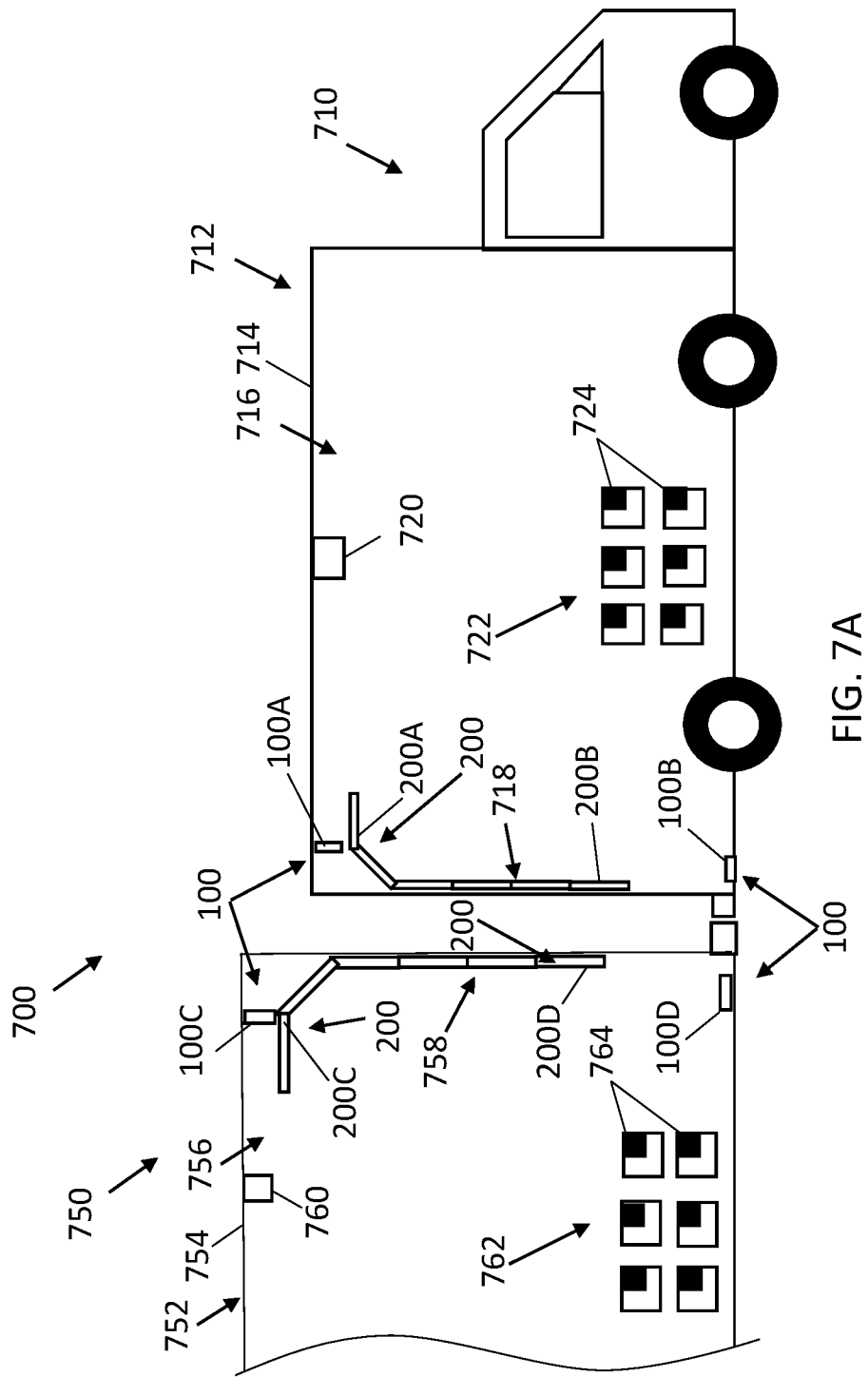
FIGS. 7A-B illustrate another example environment within which the example RFID tags with partial slot antennas can be deployed in accordance with embodiments of the present disclosure.
Figure 7B:
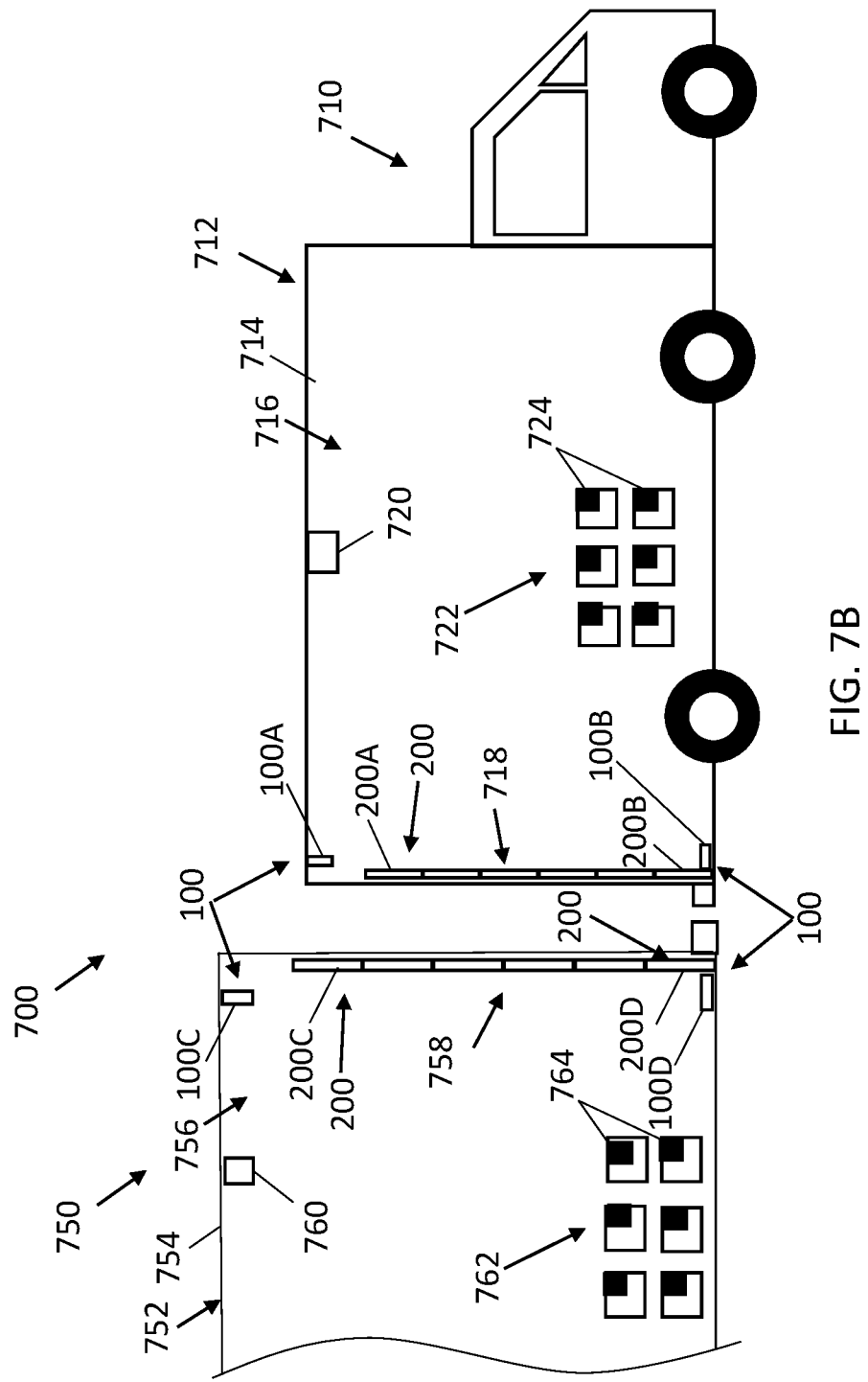

FIGS. 7A-B illustrate an example environment 700 including the RFID tag 100 with the partial slot antenna 110 in accordance with embodiments of the present disclosure. As shown in FIG. 7A, a cargo truck 710 can be docked at a cargo bay 750 of a facility (e.g., a warehouse, distribution center, retail store, etc.).

The cargo truck 710 can include a container or cargo area 712 having an enclosed structure 714 with an interior volume 716. The enclosed structure 714 can be formed, at least in part by an electrically conductive material, such a metal. A rear end of the enclosed structure 714 can include a moveable barrier 718 (e.g., a door) at least a portion of which can include or form the separate conductive element 200. As an example, the moveable barrier 718 or portion of the moveable barrier 718 can include or be formed of metal. An RFID reader 720 and objects 722 having RFID tags 724 can be positioned within the interior volume 716, and the RFID tags 724 can be read by the RFID reader 720. One or more of the RFID tags 100 with the partial slot antenna 110 can be positioned proximate to the moveable barrier 718 to be selectively readable by the RFID reader 720 based on a spatial relationship of the partial slot antennas of the RFID tags 100 and the separate conductive element(s) 200. The moveable barrier 718 can move between a closed position (FIG. 7B) and an open position (FIG. 7A) to prevent or permit access to the interior volume 716.

The cargo bay 750 can include a cargo area 752 having an enclosed structure 754 with an interior volume 756. The enclosed structure 754 can include a moveable barrier 758 (e.g., a door) at least a portion of which can include or form the separate conductive element(s) 200. As an example, the moveable barrier 758 or portion of the moveable barrier 758 can include or be formed of metal. An RFID reader 760 and objects 762 having RFID tags 764 can be positioned within the interior volume 756, and the RFID tags 764 can be read by the RFID reader 760. One or more of the RFID tags 100 with the partial slot antenna 110 can also be positioned proximate to the moveable barrier 758 to be selectively readable by the RFID reader 760 based on a spatial relationship of the partial slot antennas of the RFID tag 100s and the separate conductive element(s) 200. The moveable barrier 758 can move between a closed position (FIG. 7B) and an open position (FIG. 7A) to prevent or permit access to the interior volume 756 of the cargo bay 750.

The RFID reader 720 can be implemented to detect and/or identify the objects 722 in the interior volume 716 of the cargo area 712 based on identifiers received in responses from the RFID tags 724 and the RFID reader 760 can be implemented to detect and/or identify the objects 762 in the interior volume 756 of the cargo area 752 based on identifiers received in responses from the RFID tags 764. The range of the RFID readers 720 and/or 760 can extend beyond the cargo areas 712 and/or 752, respectively. For embodiments, in which the moveable barriers 718 and/or 758 are formed from a conductive material, the moveable barriers 718 and/or 758 and the enclosed structures 714 and/or 754 can inhibit the far-field radiofrequency communication of the interrogation signal from RFID readers 720 and/760 extending outside of the interior volumes 716 and/or 756 via the opening that is blocked by the moveable barriers 718 and/or 758, respectively. Referring to FIG. 7A, an issue can arise when the moveable barriers 718 and/or 758 are in an open position, where the RFID reader 720 can inadvertently interrogate RFID tags that are outside of the interior volume 716 and the RFID reader 760 can inadvertently interrogate RFID tags that are outside of the interior volume 756. As an example, the RFID reader 720 can inadvertently interrogate the RFID tags 764 of the object 762 and/or the RFID reader 760 can inadvertently interrogate the RFID tags 724 of the object 722 when the moveable barriers 718 and 758 are open. As a result, when the moveable barriers 718 and/or 758 are in an open position, the contents of the interior volume 716 may not be accurately reflected by the identifiers that are received in response to the interrogation signal from the RFID reader 720 and the contents of the interior volume 756 may not be accurately reflected by the identifiers that are received in response to the interrogation signal from the RFID reader 760.

The RFID tags 100 with the partial slot antenna 110 can be positioned within the interior volumes proximate to the moveable barriers 718 and/or 758 (or outside interior volumes, but proximate to the moveable barriers 718 and/or 758) and can be used by the RFID reader or computing devices in communication with the RFID reader as described herein with reference to, e.g., FIG. 5, to determine whether the moveable barriers 718 and/or 758 are in an open position or a closed position based on the spatial relationship of the RFID tags 100 relative to the separate conductive element(s) 200. In one example, the RFID reader 720 can store the identifier(s) associated with the RFID tag(s) 100 associated with the moveable barrier 718 and can determine a position of the moveable barrier 718 based on whether the identifier(s) from the RFID tag(s) 100 are or are not received by the RFID reader 720 in response to an interrogation signal from the RFID reader 720 by comparing the received identifiers to the stored identifier(s) corresponding to the RFID tag(s) 100 associated with the moveable barrier 718. The RFID reader 760 can store the identifier(s) associated with the RFID tag(s) 100 associated with the moveable barrier 758 and can determine a position of the moveable barrier 758 based on whether the identifier(s) from the RFID tag(s) 100 are or are not received by the RFID reader 760 in response to an interrogation signal from the RFID reader 760 by comparing the received identifiers to the stored identifier(s) corresponding to the RFID tag(s) 100 associated with the moveable barrier 758. Alternatively or in addition, the RFID reader 720 can transmit the identifiers it receives in response an interrogation signal to a computing device and the computing device can determine whether the identifier(s) for the RFID tag(s) 100 associated with the moveable barrier 718 have been received and can determine a position or state of the moveable structure 718 based on whether or not the identifiers have been received (e.g., as described herein with reference to FIG. 5). Similarly, the RFID reader 760 can transmit the identifiers it receives in response an interrogation signal to a computing device and the computing device can determine whether the identifier(s) for the RFID tag(s) 100 associated with the moveable barrier 758 have been received and can determine a position or state of the moveable structure 758 based on whether or not the identifiers have been received (e.g., as described herein with reference to FIG. 5).

If it is determined that the moveable barrier 718 is in the open position, the identifiers received by the RFID reader 720 can be ignored and/or discarded by the RFID reader 720 and/or by a computing device in communication with the RFID reader 720 and the RFID reader 720 can continue to retransmit the interrogation signal until it is determined that the moveable barrier 720 is in the closed position based on whether or not the RFID tag(s) 100 associated with the moveable barrier 718 are responsive. Once it is determined that the moveable barrier 718 is in the closed position, the RFID reader 720 can process the identifiers received in response to re-transmission of the interrogation signal and/or can transmit the identifiers to a computing device to determine the contents of the interior volume 716. Similarly, if it is determined that the moveable barrier 758 is in the open position, the identifiers received by the RFID reader 760 can be ignored and/or discarded by the RFID reader 760 and/or a computing device in communication with the RFID reader 760 and the RFID reader 760 can continue to retransmit the interrogation signal until it is determined that the moveable barrier 758 is in the closed position based on whether or not the RFID tag(s) 100 associated with the moveable barrier 758 are responsive. Once it is determined that the moveable barrier 758 is in the closed position, the RFID reader 760 can process the identifiers received in response to re-transmission of the interrogation signal and/or can transmit the identifiers to a computing device to determine the contents of the interior volume 756.

As shown in FIGS. 7A-B, the interior volume 716 can include one or more of the RFID tags 100 and the interior volume 756 can include one or more of the RFID tags 100. The RFID tags 100 associated with the moveable barrier 718 can be denoted as RFID tags 100A and 100B and the RFID tags 100 associated with the moveable barrier 758 can be denoted as RFID tags 100C and 100D to distinguish the various RFID tags 100 shown in FIGS. 7A-B. Likewise, the separate conductive elements 200 of the movable barrier 718 can be denoted as separate conductive elements 200A and 200B and the separate conductive elements 200 of the movable barrier 758 can be denoted as separate conductive elements 200C and 200D to distinguish the various separate conductive elements shown in FIGS. 7A-B.

The RFID tag 100A can be positioned on a ceiling of the interior volume 716 such that when the moveable barrier 718 is in the closed position, the separate conductive element 200A is greater than the threshold distance away from the RFID tag 100A (as shown in FIG. 7B) and the partial slot antenna of the RFID tag 100A inhibits the RFID tag 100A from receiving and/or responding to the far-field radiofrequency communication corresponding to the interrogation signal from the RFID reader 720. The absence of a response from the RFID tag 100A at the RFID reader 720 can indicate that the moveable barrier 718 is in the closed position. Likewise, the RFID tag 100C can be positioned on a ceiling of the interior volume 756 such that when the moveable barrier 758 is closed, the separate conductive element 200C is greater than the threshold distance away from the RFID tag 100C (as shown in FIG. 7B) and the partial slot antenna of the RFID tag 100C inhibits the RFID tag 100C from receiving and/or responding to the far-field radiofrequency communication corresponding to the interrogation signal from the RFID reader 760. The absence of a response from the RFID tag 100C at the RFID reader 760 can indicate that the moveable barrier 758 is in the closed position.

The RFID tag 100B can be positioned proximate to a floor of the interior volume 716 such that when the moveable barrier 718 is in the closed position, the separate conductive element 200B is less than the threshold distance away from the RFID tag 100B (as shown in FIG. 7B) and the partial slot antenna of the RFID tag 100B in combination with the separate conductive element 200B permits the RFID tag 100B to receive and/or respond to the far-field radiofrequency communication corresponding to the interrogation signal from the RFID reader 720. The presence of a response from the RFID tag 100B at the RFID reader 720 can indicate that the moveable barrier 718 is in the closed position. Likewise, the RFID tag 100D can be positioned proximate to a floor of the interior volume 756 such that when the moveable barrier 758 is in the closed position, the separate conductive element 200D is less than the threshold distance away from the RFID tag 100D (as shown in FIG. 7B) and the partial slot antenna of the RFID tag 100D in combination with the separate conductive element 200D permits the RFID tag 100D to receive and/or respond to the far-field radiofrequency communication corresponding to the interrogation signal from the RFID reader 760. The presence of a response from the RFID tag 100D at the RFID reader 760 can indicate that the moveable barrier 758 is in the closed position.

When the moveable barrier 718 is in the open position, the separate conductive element 200A is less than the threshold distance away from the RFID tag 100A (as shown in FIG. 7A) and the partial slot antenna of the RFID tag 100A in combination with the separate conductive element 200A permits the RFID tag 100A to receive and/or respond to the far-field radiofrequency communication corresponding to the interrogation signal from the RFID reader 720. The presence of a response from the RFID tag 100A at the RFID reader 720 can indicate that the moveable barrier 718 is in the open position. Likewise, when the moveable barrier 758 is in the open position, the separate conductive element 200C is less than the threshold distance away from the RFID tag 100C (as shown in FIG. 7A) and the partial slot antenna of the RFID tag 100C in combination with the separate conductive element 200C permits the RFID tag 100C to receive and/or respond to the far-field radiofrequency communication corresponding to the interrogation signal from the RFID reader 760. The presence of a response from the RFID tag 100C at the RFID reader 760 can indicate that the moveable barrier 758 is in the open position.

When the moveable barrier 718 is in the open position, the separate conductive element 200B is greater than the threshold distance away from the RFID tag 100B (as shown in FIG. 7A) and the partial slot antenna of the RFID tag 100B inhibits the RFID tag 100B from receiving and/or responding to the far-field radiofrequency communication corresponding to the interrogation signal from the RFID reader 720. The absence of a response from the RFID tag 100B at the RFID reader 720 can indicate that the moveable barrier 718 is in the open position. Likewise, when the moveable barrier 758 is in the open position, the separate conductive element 200D is greater than the threshold distance away from the RFID tag 100D (as shown in FIG. 7A) and the partial slot antenna of the RFID tag 100D inhibits the RFID tag 100D from receiving and/or responding to the far-field radiofrequency communication corresponding to the interrogation signal from the RFID reader 760. The absence of a response from the RFID tag 100D at the RFID reader 760 can indicate that the moveable barrier 758 is in the open position.

While the RFID tags 100A-B and/or 100C-D can be used in combination to provide redundancy for determining whether the moveable barriers 718 and/or 758, respectively, are in the open position or the closed positioned, a single one of the RFID tags 100A-B (either 100A or 100B) can be included in the interior volume 716 to determine a position of the moveable barrier 718 and/or a single one of the RFID tags 100C-D (either 100C or 100D) can be included in the interior volume 756 to determine a position of the moveable barrier 758. In some examples, the interior volume 716 can include more RFID tags 100 than the RFID tags 100A-B and the interior volume 756 can include more RFID tags 100 than the RFID tags 100C-D. Additionally or alternatively, the location, position, and/or orientation of the RFID tags 100 (e.g., 100A-B and/or 100C-D) can be different than the locations, positions, and/or orientations illustrated in FIGS. 7A-B, the RFID tags 100A-B can be disposed on the moveable barrier 718 and the separate conductive elements 200A-B can be disposed in the interior volume 716, and/or the RFID tags 100C-D can be disposed on the moveable barrier 758 and the separate conductive elements 200C-D can be disposed in the interior volume 716.

Figure 8A:
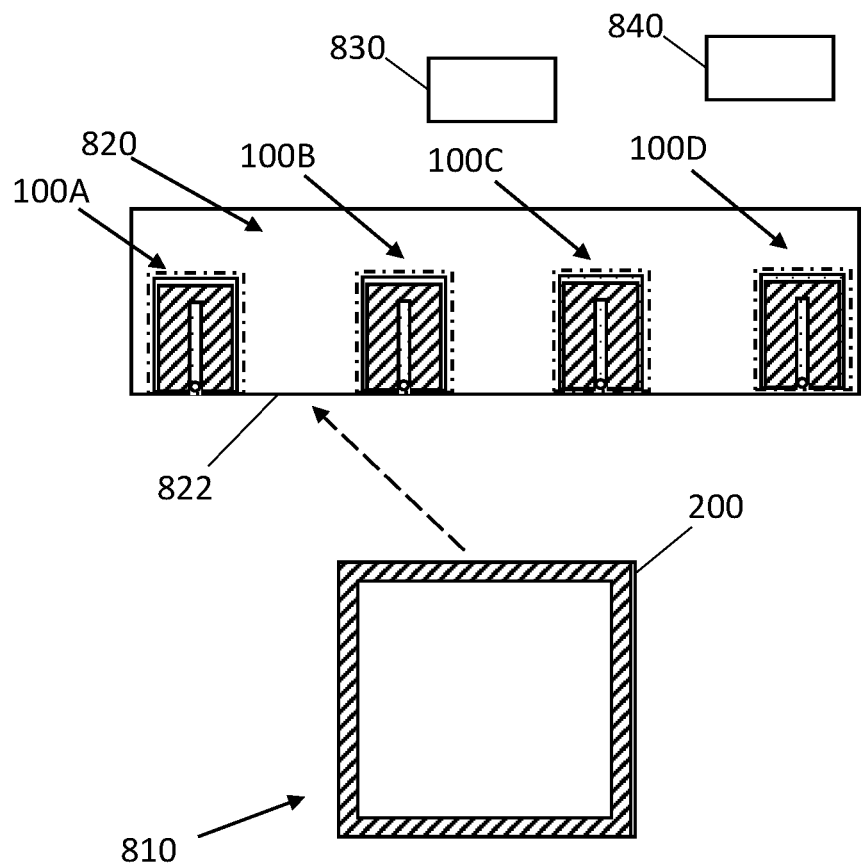
FIGS. 8A-C illustrates an environment that includes the RFID tags with partial slot antennas and an autonomous mobile robot in accordance with embodiments of present disclosure.
Figure 8B:
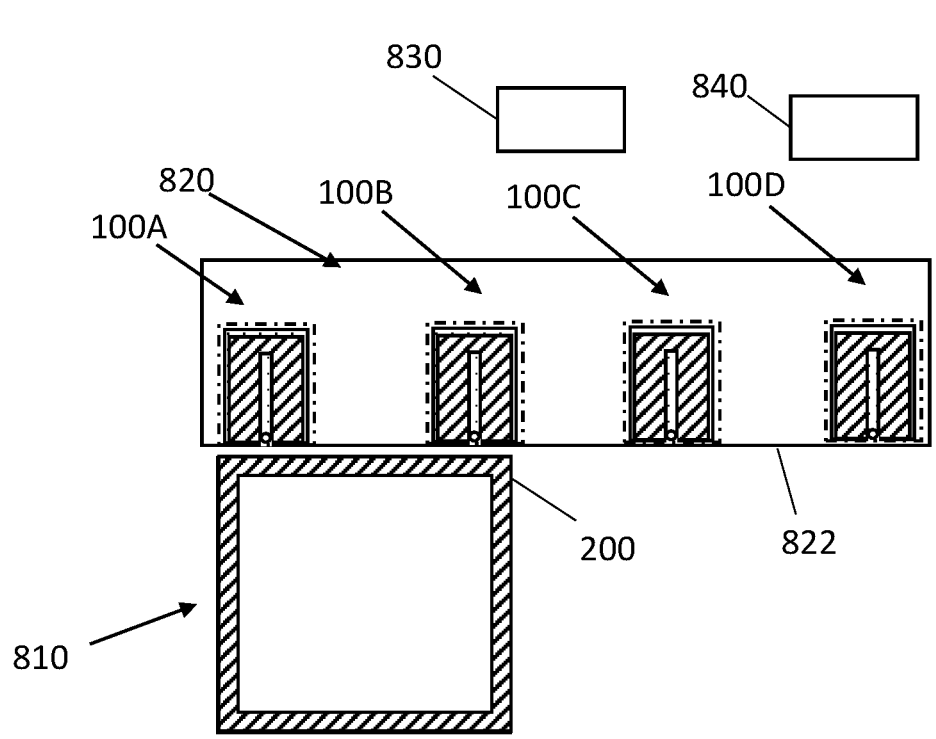

FIGS. 8A-B illustrate a plan view of an example environment 800 including the RFID tags 100A-D with partial slot antennas. As shown in FIGS. 8A-B, an autonomous mobile robot 810 can move in the environment 800 to autonomously navigate to different locations in the environment 800. For example, the autonomous mobile robot 810 can move from a first location shown in FIG. 8A to a second location shown in FIG. 8B such that the autonomous mobile robot 810 moves to be proximate to structure 820 that includes RFID tags 100A-D with the partial slot antenna, where the open end of the slots of the partial slot antennas are aligned along front edge 822 of the structure 820. The locations of the RFID tags 100A-D along the front edge 822 of the structure 820 can be stored by a RFID reader 830 or a computing device 840 in communication with the RFID reader 830. The autonomous mobile robot 810 can include the separate conductive element 200, for example on a perimeter of the autonomous mobile robot 810. In FIG. 8A, the autonomous mobile robot 810 can be positioned away from the front edge 822 of the structure 820 such that the separate conductive element 200 is greater than the threshold distance away from the proximal end of the partial slot antennas of the RFID tags 100A-D. In FIG. 8B, the autonomous mobile robot 810 has moved to be positioned proximate to a portion the front edge 822 of the structure 820 such that the separate conductive element 200 is less than the threshold distance away from the proximal end of the partial slot antennas of the RFID tags 100A-B, but not RFID tags 100C-D.

Figure 8C:
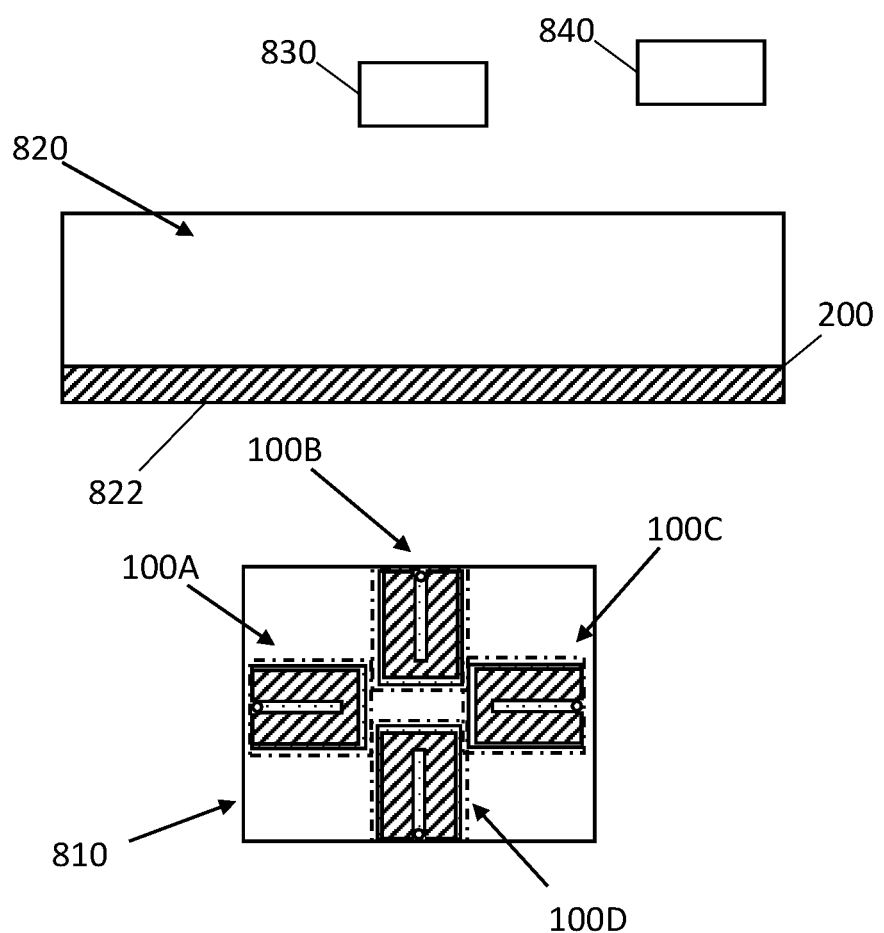

The RFID reader 830 can emit an interrogation signal as a far-field radiofrequency communication. When the autonomous mobile robot 810 is positioned as shown in FIG. 8A, the RFID tags 100A-D are unresponsive to the interrogation signal. When the autonomous mobile robot 810 is positioned as shown in FIG. 8B, the RFID tags 100A-B are responsive to the interrogation signal and the 100C-D remain unresponsive. The RFID reader 830 receives the identifiers from the RFID tags 100A-B in the responses from RFID tags 100A-B, respectively. The receipt of the identifiers from the RFID tags 100A-B, but not RFID tags 100C-D, can be used by the RFID reader 830 or by the computing device 840 in communication with the RFID reader 830 to determine a location and position of the autonomous mobile robot 810 in the environment as well as a location and position of the autonomous mobile robot 810 relative to the front edge 822 of the structure 820. The location and position of the autonomous mobile robot 810 determined based on the responses from the RFID tags 100A-B can be used to verify the expected position and location of the autonomous mobile robot 810 and/or can be transmitted from the RFID reader 830 or the computing device 840 to the autonomous mobile robot 810 so that the autonomous mobile robot 810 can update a mapping algorithm used by the autonomous mobile robot 810 to map the environment. While the RFID tags 100A-D have been illustrated as being on the structure 820 and the separate conductive element 200 has been illustrated as being on the autonomous mobile robot 810, in embodiments of the present disclosure the RFID tags 100A-D can be disposed on the autonomous mobile robot 810 and the separate conductive element 200 can be disposed on the structure 820, for example, as shown in FIG. 8C.

Figure 9:
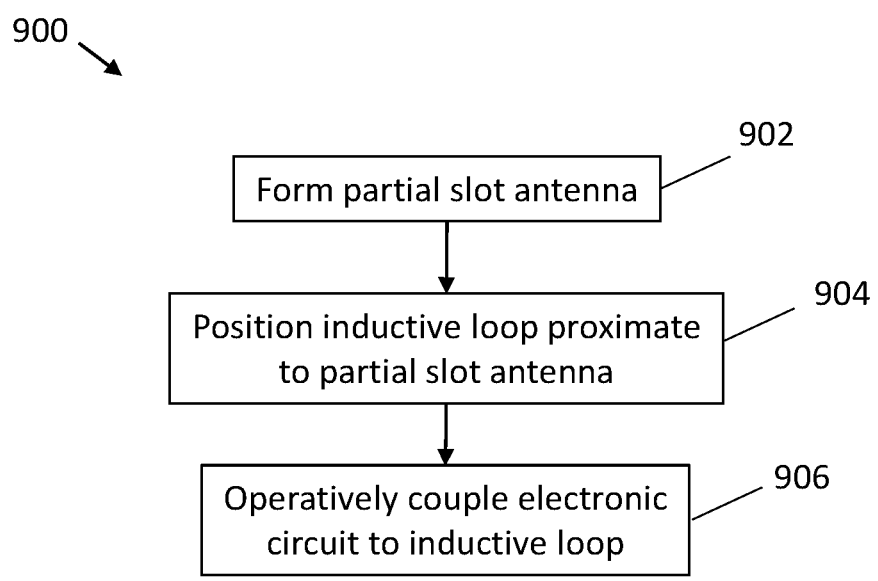
FIG. 9 is a flowchart illustrating an example process of forming an example RFID tag with a partial slot antenna in accordance with embodiments of the present disclosure.

FIG. 9 is a flowchart illustrating an example process 900 of forming an example selectively readable RFID tag (e.g., the RFID tag 100) with a partial slot antenna (e.g., the partial slot antenna 110) in accordance with embodiments of the present disclosure. At operation 902, a partial slot antenna is formed, and at operation 904, an inductive loop is positioned proximate to the partial slot antenna. The partial slot antenna can be formed by forming a slot in a planar conductive element, where the slot has at least one open end, and the inductive loop can be positioned in the slot proximate to the at least one open end. The inductive loop can be oriented to position a portion of the inductive loop flush with the at least one open end of the slot and/or can be spaced away from the planar conductive element or can overlap the planar conductive element. The slot of the partial slot antenna can have a length that is at least one of one half, one quarter, or any other fraction of the wavelength of the far-field radiofrequency communication expected from an RFID reader. At operation 906, an electronic circuit is operatively coupled to the inductive loop. The inductive loop and the electronic circuit can be pre-formed (e.g., operative coupled) before the inductive loop is positioned proximate to the partial slot antenna. The partial slot antenna inhibits the electronic circuit from receiving or transmitting a far-field radiofrequency communication when a separate conductive element in an environment surrounding the partial slot antenna is positioned greater than a threshold distance away from the partial slot antenna. The partial slot antenna, the inductive loop, and the electronic circuit can be positioned on a substrate.

Figure 10:
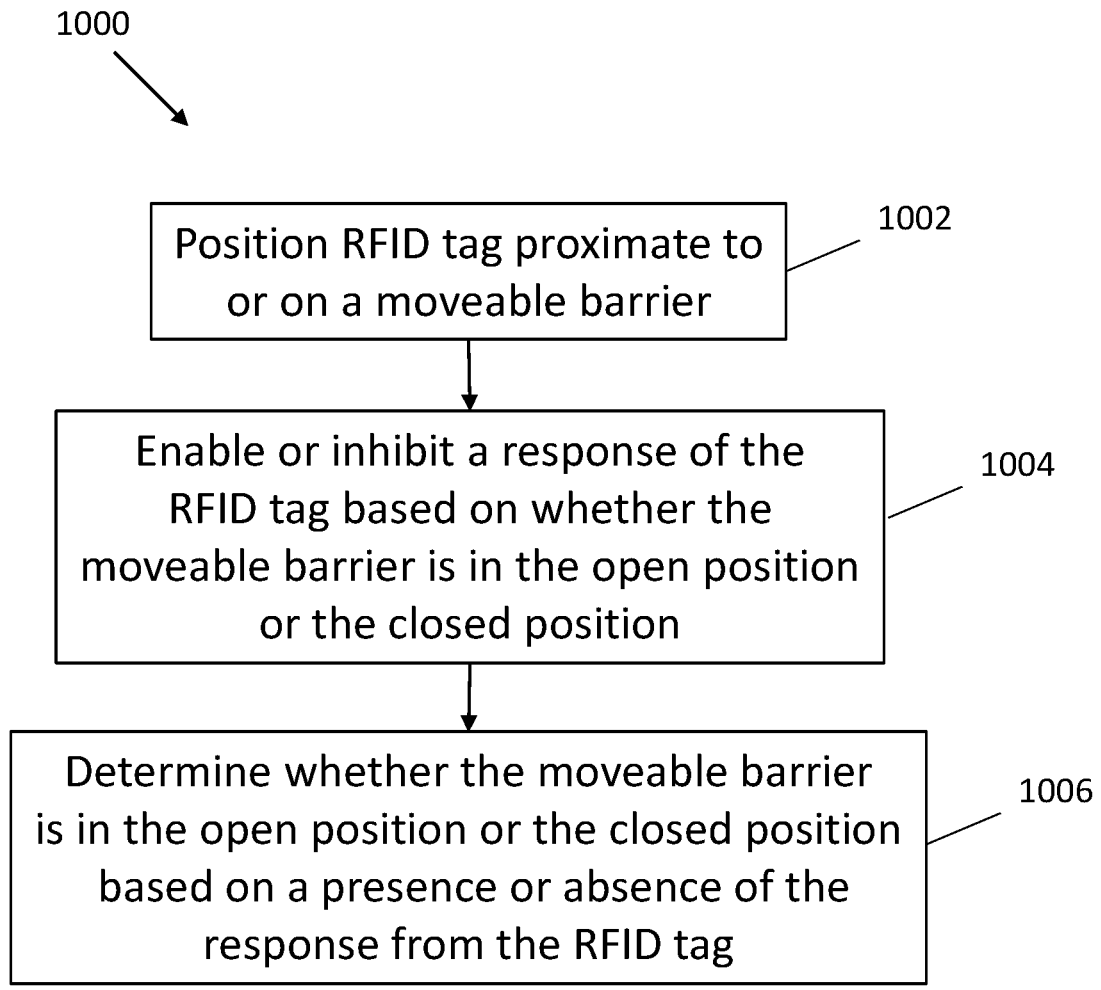
FIG. 10 is a flowchart illustrating an example process of selectively reading an example RFID tag with a partial slot antenna in accordance with embodiments of the present disclosure.

FIG. 10 is a flowchart illustrating an example process 1000 of selectively reading an example RFID tag (e.g., the RFID tag 100) with a partial slot antenna (e.g., the partial slot antenna 110) in accordance with embodiments of the present disclosure. At operation 1002, a selectively readable RFID tag including a partial slot antenna is positioned proximate to a moveable barrier or on the moveable barrier. At operation 1004, a response of the selectively readable RFID tag to a far-field radiofrequency communication is enabled or inhibited based on whether the moveable barrier is in the open position or the closed position. At operation 1006, a processor of an RFID reader or computing device determines whether the moveable barrier is in the open position or the closed position based on a presence or absence of the response from the RFID tag.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A selectively readable RFID tag, comprising:
a partial slot antenna;
an inductive loop disposed proximate to the partial slot antenna; and
an electronic circuit, the electronic circuit is operatively coupled to the inductive loop to selectively respond to far-field radiofrequency communication based on a distance between the partial slot antenna and a separate conductive element.

2. The selectively readable RFID tag of claim 1, wherein the partial slot antenna inhibits responding to the far-field radiofrequency communication when the distance between the separate conductive element and the partial slot antenna is greater than a threshold distance and enables responding to the far-field radiofrequency communication when the distance between the separate conductive element and the partial slot antenna is less than the threshold distance.

3. The selectively readable RFID tag of claim 2, wherein the partial slot antenna has an incomplete antenna structure that inhibits responding to the radiofrequency communication.

4. The selectively readable RFID tag of claim 3, wherein the incomplete antenna structure of the partial slot antenna is completed in response to the conductive element being positioned less than the threshold distance away from the incomplete structure of the partial slot antenna and completion of the incomplete structure of the partial slot antenna enables responding to the far-field radiofrequency communication.

5. The selectively readable RFID tag of claim 1, wherein the partial slot antenna comprises:
a planar conductive element; and
a slot formed in the planar conductive element, the slot having at least one open end.

6. The selectively readable RFID tag of claim 5, wherein the inductive loop is positioned in the slot proximate to the at least one open end.

7. The selectively readable RFID tag of claim 6, wherein the inductive loop is oriented to position a portion of the inductive loop flush with the at least one open end of the slot.

8. The selectively readable RFID tag of claim 1, wherein the partial slot antenna includes a slot having a length that is one half or one quarter of a wavelength of the far-field radiofrequency communication.

9. The selectively readable RFID tag of claim 1, wherein the partial slot antenna is disposed at least one of:
proximate to a moveable barrier and at least a portion of the moveable barrier includes the separate conductive element such that when the moveable barrier is in an open or a closed position, the separate conductive element is within a threshold distance of the partial slot antenna enabling the RFID tag to respond to the far-field radiofrequency communication; or on the moveable barrier and the separate conductive element is positioned within the threshold distance when the moveable barrier is in the open position or the closed position enabling the RFID tag to respond to the far-field radiofrequency communication.

10. A method of forming a selectively readable RFID tag, the method comprising:

forming a partial slot antenna;

positioning an inductive loop proximate to the partial slot antenna; and operatively coupling an electronic circuit to the inductive loop, the partial slot antenna inhibits the electronic circuit from responding to a far-field radiofrequency communication when a separate conductive element in an environment surrounding the partial slot antenna is positioned greater than a threshold distance away from the partial slot antenna.

11. The method of claim 10, wherein forming the partial slot antenna comprises:

forming a slot in a planar conductive element, the slot having at least one open end.

12. The method of claim 11, wherein positioning the inductive loop proximate to the partial antenna comprises:

positioning the inductive loop in the slot proximate to the at least one open end.

13. The method of claim 12, further comprising:

orientating the inductive loop to position a portion of the inductive loop flush with the at least one open end of the slot.

14. The method of claim 10, wherein forming the partial slot antenna comprises:

forming a slot having a length that is one half or one quarter of a wavelength of the radiofrequency communication.

15. The method of claim 10, further comprising:

positioning the partial slot antenna, the inductive loop, and the electronic circuit on a substrate.

16. A system for detecting a spatial relationship of structures in an environment, the system comprising:

a RFID tag having a partial slot antenna, the RFID tag having a non-readable state and a readable state; and a RFID reader disposed greater than a specified distance away from the far-field RFID tag and within a communication range of the RFID tag, the RFID reader attempts to communicate with the selectively readable RFID tag using far-field radiofrequency communication.

17. The system of claim 16, wherein the RFID reader determines whether the RFID tag is in the non-readable state or the readable state based on whether an identifier of the selectively readable RFID tag is received in response to far-field radiofrequency communication from the RFID reader.

18. The system of claim 16, further comprising:

a computing device in communication with the RFID reader, the computing device determines whether the RFID tag is in the non-readable state or the readable state based on whether an identifier of the selectively readable RFID tag is received in response to the far-field radiofrequency communications from the RFID reader.

19. The system of claim 16, wherein the RFID tag further comprises:

a partial slot antenna;

an inductive loop disposed proximate to the partial slot antenna; and an electronic circuit, the electronic circuit operatively coupled to the inductive loop to selectively respond to far-field radiofrequency communication.

20. The system of claim 19, wherein the partial slot antenna inhibits responding to the far-field radiofrequency communication when a separate conductive element is positioned greater than a threshold distance away from the partial slot antenna and enables the responding to the far-field radiofrequency communication when the separate conductive element is positioned less than the threshold distance away from the partial slot antenna.

21. The system of claim 16, wherein the selectively readable RFID tag is disposed at least one of:

proximate to a moveable barrier and at least a portion of the moveable barrier includes the separate conductive element such that when the moveable barrier is in an open or a closed position, the separate conductive element is within a threshold distance of the partial slot antenna enabling the RFID tag to respond to the far-field radiofrequency communication; or on the moveable barrier and the separate conductive element is positioned within the threshold distance when the moveable barrier is in the open position or the closed position enabling the RFID tag to respond to the far-field radiofrequency communication.

22. A method of detecting a state of a moveable barrier, the method comprising:

positioning a selectively readable RFID tag proximate to a moveable barrier or on the moveable barrier, the selectively readable RFID tag including a partial slot antenna;

enabling or inhibiting a response of the selectively readable RFID tag to a far-field radiofrequency communication based on whether the moveable barrier is in the open position or the closed position; and determining whether the moveable barrier is in the open position or the closed position based on a presence or absence of the response from the RFID tag.

23. The method of claim 22, further comprising:

opening or closing the moveable barrier; and in response to opening or closing the moveable barrier, positioning the partial slot antenna within a threshold distance of a separate conductive element to enable the selectively readable RFID tag to respond to the radiofrequency communication.

* * * * *